United States Patent [19]

Yasumoto et al.

[11] Patent Number: 5,036,386
[45] Date of Patent: Jul. 30, 1991

[54] TELEVISION SIGNAL PROCESSING APPARATUS

[75] Inventors: Yoshio Yasumoto, Nara; Sadashi Kageyama, Hirakata; Syuji Inoue, Neyagawa; Yoshio Abe, Ibaraki; Hideyo Uwabata, Neyagawa, all of Japan

[73] Assignee: Matsushita Electric Industrial Co., Ltd., Osaka, Japan

[21] Appl. No.: 383,154

[22] Filed: Jul. 19, 1989

[30] Foreign Application Priority Data

Jul. 22, 1988 [JP] Japan ................................ 63-184302
Jul. 22, 1988 [JP] Japan ................................ 63-184303
Jul. 22, 1988 [JP] Japan ................................ 63-184304

[51] Int. Cl.$^5$ ........................ H04N 7/00; H04N 11/00
[52] U.S. Cl. ...................................... 358/12; 358/11; 358/140; 358/141
[58] Field of Search .................... 358/11, 12, 140, 141

[56] References Cited

U.S. PATENT DOCUMENTS

| 4,521,803 | 6/1985 | Gittinger | 358/12 |
| 4,535,352 | 8/1985 | Haskell | 358/11 |
| 4,652,904 | 3/1987 | van de Polder | 358/12 |
| 4,855,824 | 8/1989 | Fuhrer | 358/12 |

FOREIGN PATENT DOCUMENTS

| 182686 | 10/1984 | Japan | 358/138 |
| 184 | 1/1987 | Japan | . |
| 274994 | 11/1987 | Japan | . |

OTHER PUBLICATIONS

ACTV: Advanced Compatible Television, Fernseh und Kino Technik 42 Jahrgang, No. 71, 1988, pp. 305-311.
Tonge, The Sampling of Television Images, IBA Experimental & Development Report, 112/81, May 1981.
"U.S. Color Television Fundamentals—A Review", IEEE Trans. Consumer Electron. (vol. CE-23, pp. 467-478, Nov. 1977); Pritchard, pp. 2-13.
"Improving NTSC to Achieve Near-RGB Performance", SMPTE J. (vol. 96, pp. 750-762, Aug. 1987); Faroudja et al.
"Extended Definition TV Fully Compatible with Existing Standards", IEEE Trans. Commun. (vol. COM-32, pp. 948-953, Aug. 1984); Fukinuki et al.
"A Single Channel NTSC Compatible Widescreen EDTV System", HDTV Colloquium in Ottawa, Oct. 1987; Isnardi et al.
"An Extended Definition Television System Using Quadrature Modulation of the Video Carrier with Inverse Nyquist Filter", IEEE Trans. Consumer Electron., (vol. CE-33, pp. 173-180, Aug. 1987); Yasumoto et al.

*Primary Examiner*—John W. Shepperd
*Attorney, Agent, or Firm*—Wenderoth, Lind & Ponack

[57] ABSTRACT

A signal processing apparatus in a television signal transmitting system includes: a first group of delay lines for obtaining a first series of parallel signals; a first group of coefficient multipliers for weighting the first series of signals; a first adder for adding outputs of the first group of coefficient multipliers; a second group of delay lines for obtaining a second series of parallel signals; a second group of coefficient multipliers for weighting the second series of signals; a second adder for adding outputs of the second group of coefficient multipliers and one of the first series of signals; and a transmitter for transmitting output signals from the first and second adders. A signal processing apparatus in a television signal receiving system includes: an input circuit for receiving first and second signals; a first group of delay lines for obtaining a first series of parallel signals; a first group of coefficient multipliers for weighting the first series of signals; a first adder for adding outputs of the first group of coefficient multipliers and the second signal; a second group of delay lines for obtaining a second series of parallel signals; a second group of coefficient multipliers for weighting the second series of signals; a coefficient multiplier for weighting one of the first series of signals; a second adder for adding outputs of the second group of coefficient multipliers and the coefficient multiplier; and a signal composer for composing the output signals from the first and second adders.

2 Claims, 22 Drawing Sheets

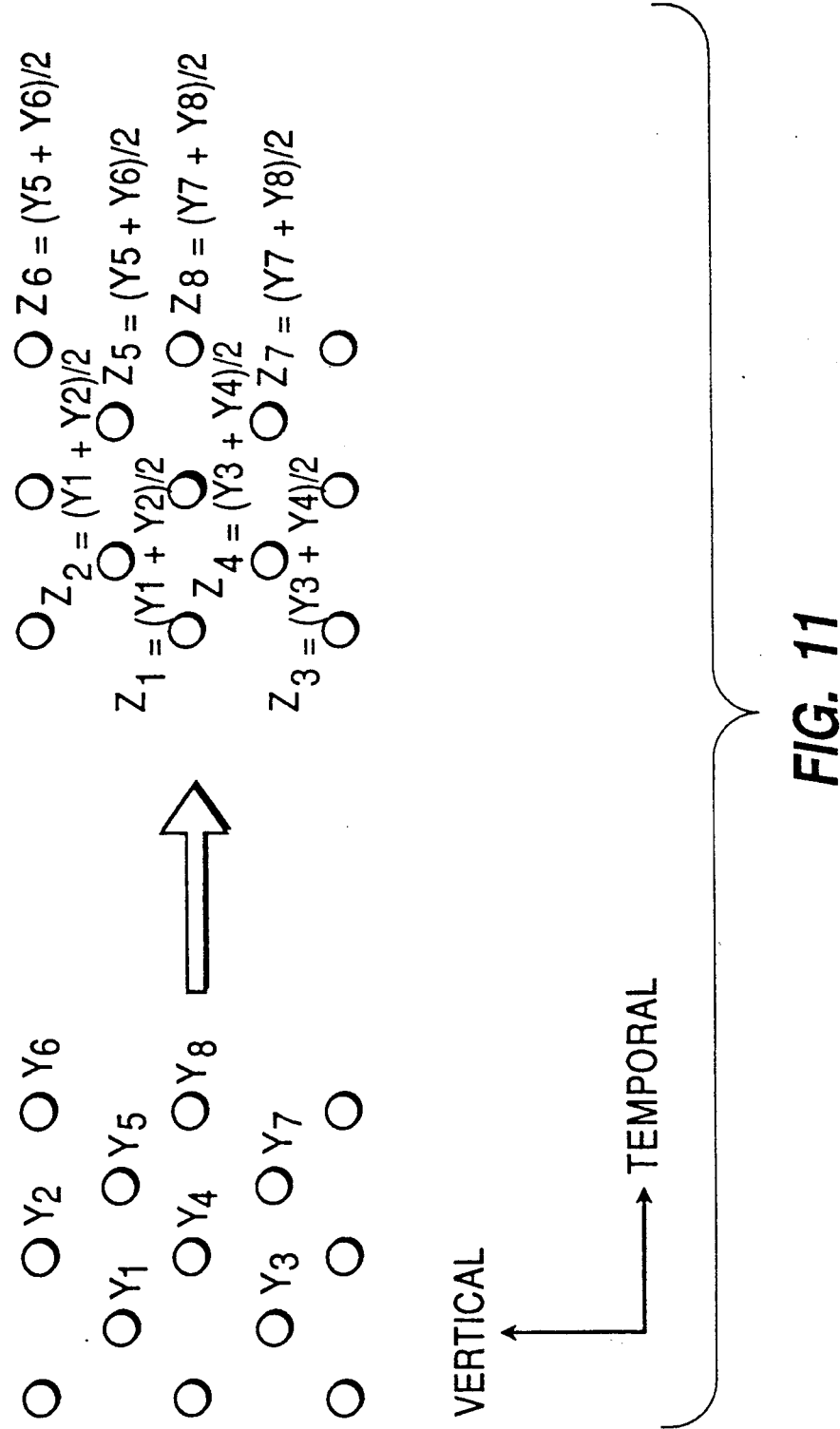

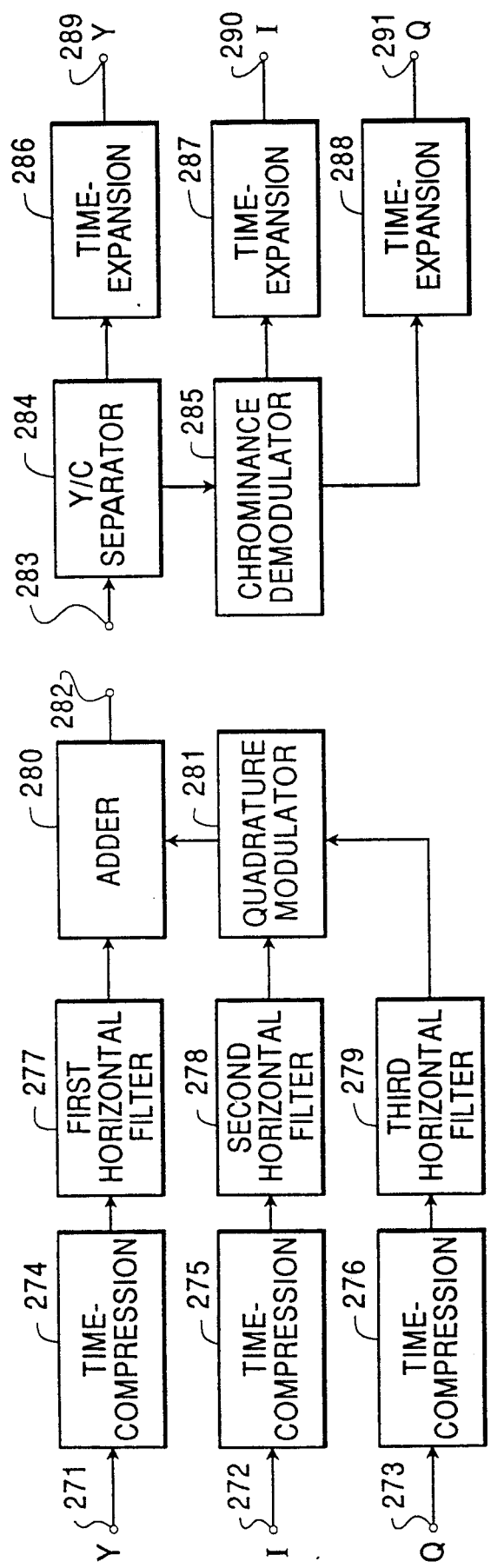

TELEVISION SIGNAL PROCESSING APPARATUS

BACKGROUND OF THE INVENTION

1. Field of the Invention

This invention relates to an apparatus for extracting a specific signal from a television signal source, multiplexing it with a television signal, transmitting and receiving the multiplexed signal, and extracting the specific signal from the multiplexed signal.

2. Description of the Prior Art.

More than 35 years have passed since the color television broadcasting of the current NTSC (National Television System Committee) system began in 1954. Recently, in search of finer definition and higher performance television systems, several new systems including HDTV (High Definition Television) systems have been proposed. At the same time, the contents of the programs presented to viewers have been changed from the mere studio programs to programs providing higher quality images and more realistic feeling such as cinema-size movies.

The current NTSC broadcasting is standardized by 2:1 interlaced 525 scanning lines, a luminance signal bandwidth of 4.2 MHz, and an aspect ratio of 4:3. (See, for example, Pritchard, "US Color Television Fundamentals-A Review", IEEE Trans. Consumer Electron., vol. CE-23, pp. 467-478, November 1977).

In this background, several television signal composition methods aiming at compatibility with the current broadcasting system and enhancement of horizontal resolution have been proposed. One of such examples is presented in a paper of Faroudja and Roisen, "Improving NTSC to achieve near-RBG performance", SMPTE J., vol. 96, pp. 750-761, August 1987. They use a comb filter to split luminance and chrominance signals at the transmitting end and avoid crosstalk between them at a receiver. This method is useful for eliminating an annoying crosstalk on the received image, but horizontal and vertical high frequency components of the luminance signal cannot be transmitted, nor can the enhancement of the resolution be attained. Another example is presented in a paper of Fukinuki and Hirano, "Extended Definition TV Fully Compatible with existing Standards", IEEE Trans. Commun., vol. COM-32, pp. 948-953, August 1984. Considering the NTSC television signal expressed on a two-dimensional plane of temporal frequency f1 and vertical frequency f2, the chrominance signals C are present in the second and fourth quadrants due to their phase relationships to the chrominance subcarrier fsc. The Fukinuki et al example uses the vacant first and third quadrants for multiplexing the high frequency components of the luminance signal. These vacant quadrants are called the "Fukinuki Hole" after the inventor. The chrominance signal and the multiplex high frequency components are separated and reproduced at the receiving end, thereby enhancing the horizontal resolution. In this example, the conventional NTSC receiver would be interfered with by the multiplex signal, because the example has no ability for separating the chrominance signal from the multiplex high frequency components. In the current television broadcast, as is clear from the description above, the signal bandwidth is limited by the standard, and it is not easy to add some new information with a high quality. For example, other methods to enhance the horizontal resolution have been proposed (M. Isnardi et al, "A Single Channel NTSC Compatible Widescreen EDTV System", HDTV Colloquium in Ottawa, October, 1987), but many problems are left unsolved from the viewpoint of the compatibility with the current television broadcasting and the deterioration of demodulation characteristics of the high frequency components in a moving picture. Besides, from the standpoint of effective use of the frequency resources, the transmission band cannot be easily extended.

The present inventors invented a method of superposing a signal by using quadrature modulation of the video carrier (U.S. Pat. No. 4,882,614 which issued Nov. 21, 1989, or see Yasumoto et al, "An extended definition television system using quadrature modulation of the video carrier with inverse Nyquist filter", IEEE Trans. Consumer Electron., vol. CE-33, pp. 173-180, August 1987). By this method, various signals can be transmitted using the newly established quadrature channel and the interference to the conventional NTSC receiver is very small in principle. But the interference can be detected in practice, because of the imperfectness of the characteristics of filters at the receiver and transmitter.

This invention is one solution to avoid imperfectness of those systems mentioned above. Even if the imperfectness of such filters/circuits occur, the interference to the conventional NTSC receivers can be reduced down to an acceptable level. In this sense, this invention is very useful when one transmits the multiplex signal using quadrature modulation of the video carrier.

SUMMARY OF THE INVENTION

It is a primary object of this invention to provide a television signal processing apparatus for multiplex transmission of a large quantity of information in a limited bandwidth without interference to the current receiver.

According to this invention, quadrature modulation of the video carrier with an inverse Nyquist filter for the multiplex signal, hidden portions of the main NTSC signal (the portions which are not displayed on a screen by over-scanning of a receiver) and the front porch of horizontal synchronous signal of the main NTSC signal, and the "Fukinuki Hole", for transmitting various multiplex signals are used.

One method is to transmit the Vertical-Temporal component extracted from progressive scanning signal source using the above mentioned quadrature modulation of the video carrier. This V-T component can significantly enhance the normal NTSC picture which comes from interlace scanning signal sources, although the bandwidth of the V-T component can be reduced down to about 1 MHz. One merit to transmit the V-T component by using the quadrature modulation is that the interference from this signal to the conventional receiver is never perceived owing to its correlation to the main NTSC picture.

Another method is to transmit the Vertical-Horizontal component adaptively using the "Fukinuki Hole" in order to avoid crosstalk between the luminance and chrominance signals as mentioned above. When the picture is still, it is unnecessary to transmit the V-H component by using the "Fukinuki Hole" because there exists no crosstalk between the luminance and chrominance signals if their separation is performed by frame memories 3 dimensionally. But when the picture is moving, it is desirable to remove the V-H component at the transmitting site to avoid the crosstalk. Therefore, the V-H component must be transmitted by the other channel in order to keep the resolution the same as that of the NTSC signal.

Still another method is effected by transmitting the high frequency component of the luminance signal of the side panels of a wide screen picture using quadrature modulation, the low frequency component of the luminance and chrominance signals of the side panels by the above mentioned hidden portion and/or front porch, the and high frequency component of the luminance signal of the center panel and the high frequency component of the chrominance signal of the side panels by the "Fukinuki Hole". The advantage of this method is the least possible interference to the conventional receiver because the most powerful signal including DC component is transmitted by the hidden portion and the high frequency component of the center panel has a correlation with the main NTSC signal which means less visible artifacts to the conventional receiver even if the "Fukinuki Hole" is imperfect as a multiplex channel.

Another similar method is to transmit the first high frequency component of the luminance signal and the high frequency component of the chrominance signal of the side panels of a wide screen picture using quadrature modulation, the low frequency component of the luminance and chrominance signals of the side panels by the hidden portion, and the second high frequency component of the luminance signal of the side panels and the high frequency component of the luminance signal of the center panels by the "Fukinuki Hole".

The above-noted object may be effected by providing a signal processing apparatus in a television signal transmitting system, including; a first group of delay lines for delaying an input signal to obtain a first series of signals in parallel; a first group of coefficient multipliers for weighting the first series of signals; a first adder for adding outputs of the first group of coefficient multipliers; a second group of delay lines for delaying an output signal from said first adder to obtain a second series of signals in parallel; a second group of coefficient multipliers for weighting the second series of signals; a second adder for adding outputs of the second group of coefficient multipliers and one of the first series of signals; and a transmitter for transmitting the output signal from the first adder and an output signal from the second adder.

The above noted object may also be effected by providing a signal processing apparatus in a television signal receiving system, including: an input circuit for receiving a first signal and a second signal; a first group of delay lines for delaying the first signal to obtain a first series of signals in parallel; a first group of coefficient multipliers for weighting the first series of signals; a first adder for adding outputs of the first group of coefficient multipliers and the second signal; a second group of delay lines for delaying an output signal from the first adder to obtain a second series of signals in parallel; a second group of coefficient multipliers for weighting the second series of signals; a coefficient multiplier for weighting one of the first series of signals; a second adder for adding outputs of the second group of coefficient multipliers and an output of the coefficient multiplier; and a signal composer for composing the output signal from the first adder and an output signal from the second adder.

By employing the above mentioned techniques, when the multiplex signal is received by an existing television receiver, there is almost no interference due to the multiplex signal. In other words, the compatibility with the existing television receivers can be maintained. Furthermore, the feature that multiplex transmission of other information is possible in a frequency band determined by the standard is very advantageous also from the viewpoint of effective use of frequency resources.

BRIEF DESCRIPTION OF THE DRAWINGS

FIGS. 8, 9, 13, 21, 23(a), and 25(a) are block diagrams each showing a television signal processor at the transmission side embodying this invention.

FIGS. 10, 14, 22, 23(b), and 25(b) are block diagrams each showing a television signal processor at the reception side embodying this invention.

FIG. 11 is a 2-dimensional scheme of television signals showing the processing method of reducing the diagonal resolution at the transmission side of this invention.

DETAILED DESCRIPTION OF THE PREFERRED EMBODIMENTS

Figure 1A:
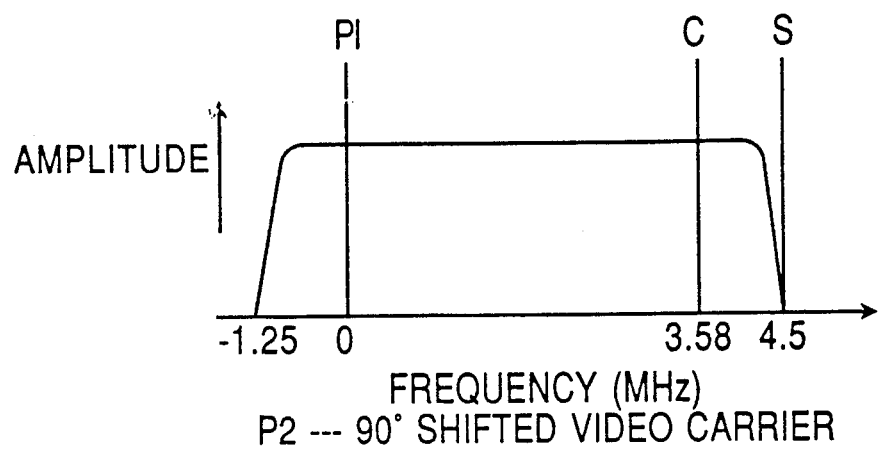
FIGS. 1(a)–(c) are spectral diagrams showing the processing method of the multiplex signal processor at the transmission side.
Figure 1B:
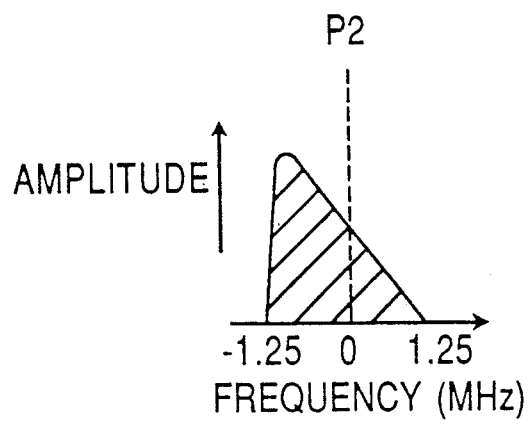
Figure 1C:
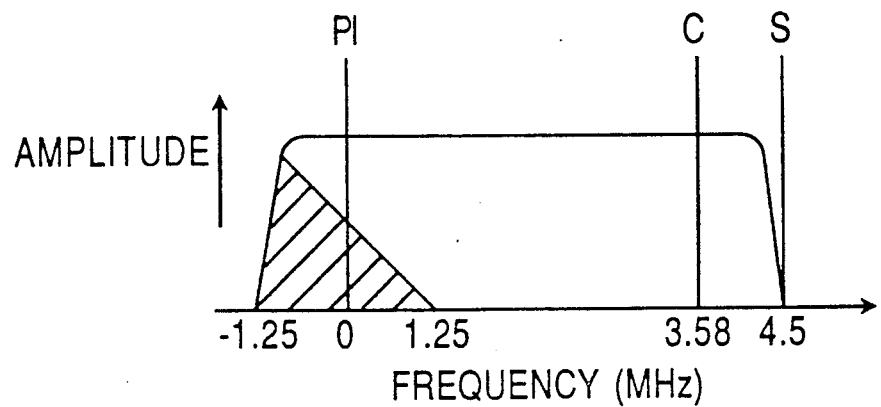

FIGS. 1(a)–(c) are spectral diagrams which show the quadrature modulation of the video carrier at the transmission side. More specifically, FIG. 1(a) is a spectral diagram of a vestigial sideband, amplitude modulated television signal in the NTSC television system, in which the lower sideband of a video carrier P1 is the vestigial sideband. In this case, the signal may be any amplitude modulated television signal, and thus it is not limited to the NTSC television signal.

FIG. 1(b) is a spectrum of a signal which is obtained by amplitude modulating a multiplex signal by a carrier P2 which is same in frequency as and different in phase by 90 degrees from the video carrier P1 and passing the modulated signal through a special filter which is called an "inverse Nyquist filter". The frequency characteristic of the inverse Nyquist filter is −6 dB at frequency P2, infinite attenuation at P2+1.25 MHz, and no attenuation at P2−1.25 MHz. Preferably, the carrier P2 is removed in the blanking period of the main television signal.

The signal shown in FIG. 1(b) is multiplexed with the main television signal shown in FIG. 1(a) to obtain a composite signal as shown in FIG. 1(c). The multiplex signal may be either an analog signal or a digital signal.

Figure 2:
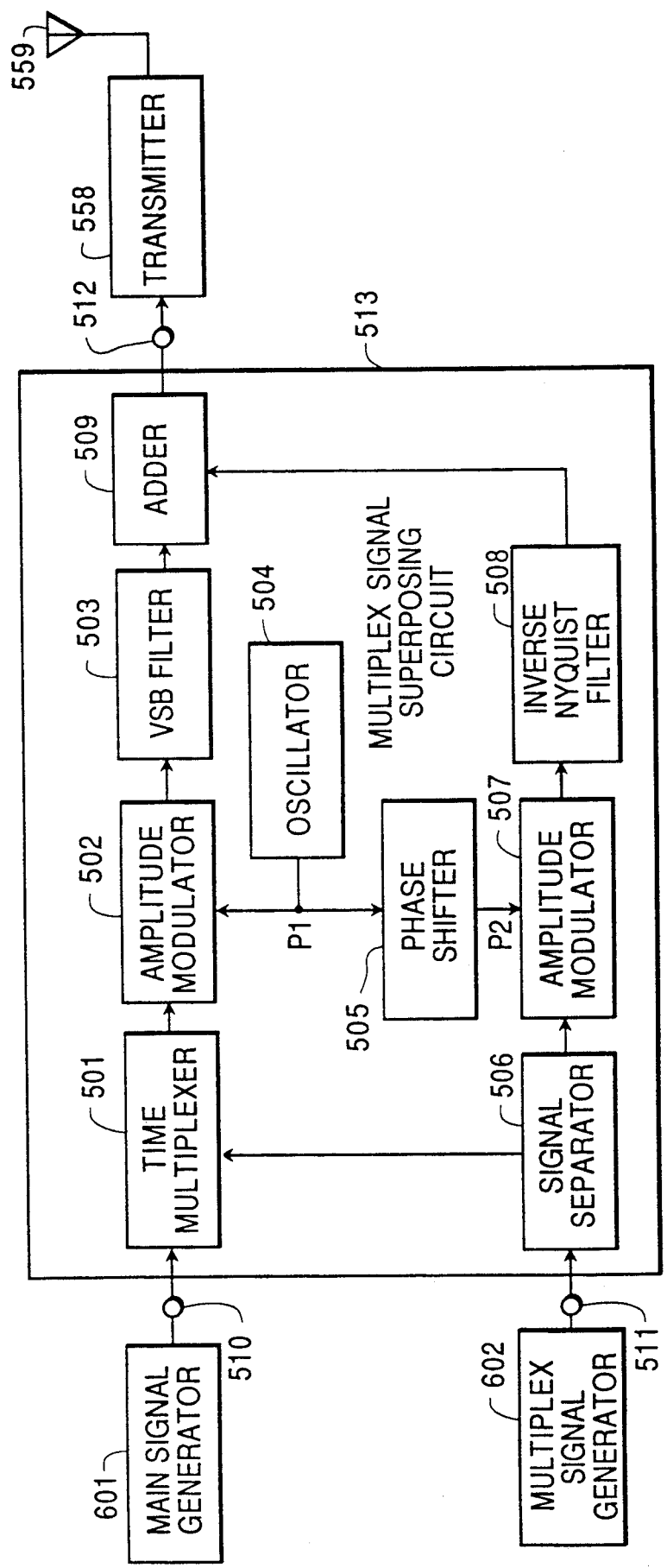
FIG. 2 is a block diagram showing the process method of the multiplex signal processor at the transmission side.

FIG. 2 is a block diagram showing a television multiplex signal processor at the transmission side. A main signal generator 601 generates a main signal such as a video baseband signal. A multiplex signal generator 602 generates a multiplex signal which is either an analog or a digital signal. The main and multiplex signals are fed to a multiplex signal superposing circuit 513 through input terminals 510 and 511, respectively.

In the multiplex signal superposing circuit 513, the multiplex signal is separated by a signal separator 506 into two parts, one of which is multiplexed with the main signal by a time multiplexer 501, and the other is amplitude-modulated by an amplitude modulator 507. The first multiplex signal from the signal separator 506 is multiplexed at the hidden portions of the over-scanning and the front porch of the horizontal synchronous signal of the main video baseband signal by the time multiplexer 501. By the main signal coming from the time multiplexer 501, the video baseband signal multiplexed with a part of the multiplex signal, a carrier P1 generated by an oscillator 504 is amplitude-modulated by an amplitude modulator 502. The modulated signal is filtered by a VSB filter 503 to become a vestigial sideband signal, which is fed to an adder 509. The VSB filter 503 is a filter used to transform a double sideband signal into a vestigial sideband signal. The carrier P1 from the oscillator 504 is shifted in phase by 90 degrees by a phase shifter 505 to form a carrier P2.

By the second part of the multiplex signal separated by the signal separator 506, the carrier P2 is amplitude-modulated in double sideband by the amplitude modulator 507, and preferably in the blanking period, the carrier is suppressed. The phase shift direction of the phase shifter 505 may be either fixed or varied at intervals of the horizontal scanning period, field or frame. The modulated multiplex signal is limited in the band by an inverse Nyquist filter 508, and then fed to the adder 509. The amplitude frequency characteristic of the inverse Nyquist filter 508 is symmetrical to an amplitude frequency characteristic immediately before video detection at the receiver with respect to the video carrier.

The output of the adder 509 is a composite signal. That is, the modulated multiplex signal is superposed on the modulated video baseband signal by the adder 509 to obtain the composite signal. The composite signal appearing at an output terminal 512 of the multiplex signal superposing circuit 513 is transmitted from a transmitter 558 with an antenna 559. The transmission path is not limited to the wireless system, but may be a wired system. In this example, the composite signal is obtained by adding the outputs of the VSB filter 503 and the inverse Nyquist filter 508, but it is also possible to feed the sum of the outputs of the amplitude modulator 502 and the inverse Nyquist filter 508 into the VSB filter 503 to obtain the composite signal.

Figure 3A:
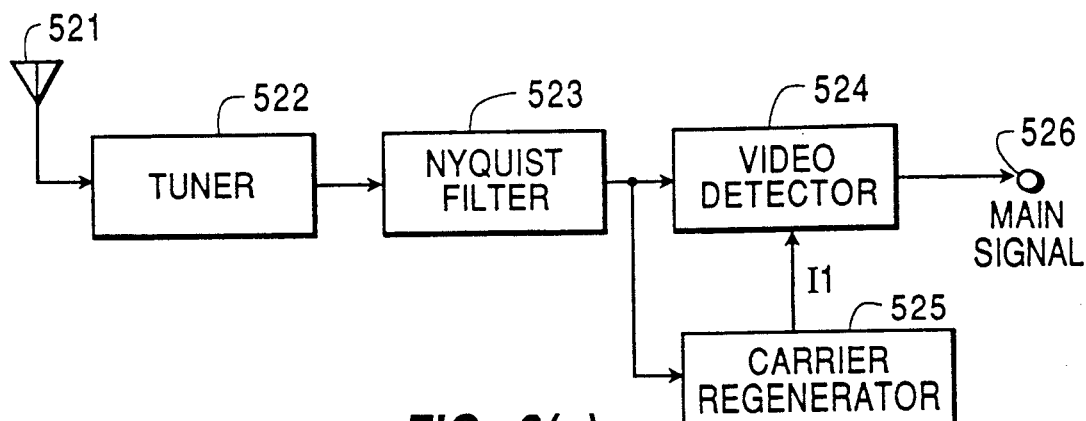
FIGS. 3(a) 3(b) and 3(c) are a block diagram, spectral diagram, and vector diagram showing a conventional television receiver when receiving the composite signal generated by the multiplex signal processor.

FIG. 3(a) is a block diagram of an existing television receiver with a synchronous video detector. The signal transmitted from the transmission side is received by an antenna 521, converted in frequency to an intermediate frequency band by a tuner 522, and limited in the band by a Nyquist filter 523. The band-limited signal is fed into a video detector 524 and a carrier regenerator 525. In the carrier regenerator 525, the video carrier I1 for synchronous detection is regenerated. The band-limited signal is synchronously detected by the carrier I1 by the video detector 524 to obtain the main signal, that is the video baseband signal, at an output terminal 526.

Figure 3B:
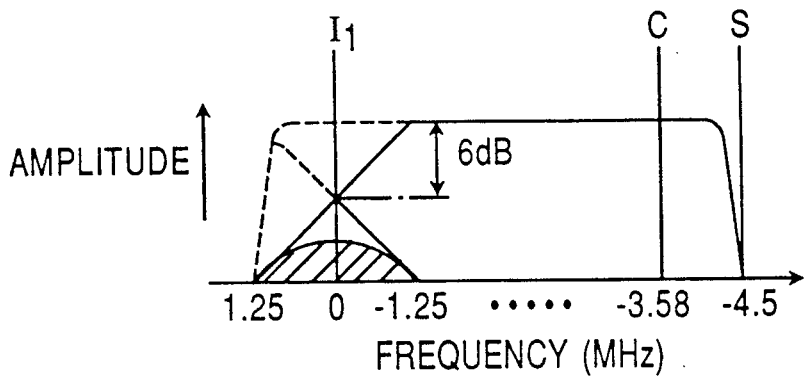

The frequency characteristic of the Nyquist filter 523 is as follows. Referring to FIG. 3(b) which shows the frequency characteristic of the Nyquist filter 523, the amplitude is attenuated by 6dB at the video carrier I1, and the Nyquist filter characteristic possesses nearly an odd-symmetrical amplitude property with respect to the video carrier I1.

Figure 3C:
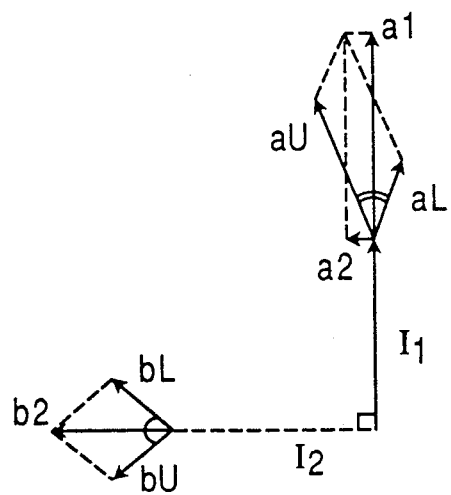

On the other hand, as shown in FIG. 1(b), when the multiplex signal is limited in band by the inverse Nyquist filter 508 in the transmitter having an inverse characteristic to the frequency characteristic of the Nyquist filter 523 in the receiver, the multiplex signal components in the shaded area in FIG. 3(b) is nearly double sideband. This can be expressed by a vector diagram as shown in FIG. 3(c), in which I1 is the video carrier of the main signal, that is, the video baseband signal, and I2 is the carrier of the multiplex signal which carrier is same in frequency as but different in phase by 90 degrees from I1. The video baseband signal is a vestigal sideband with respect to the carrier I1, so that the upper and lower sidebands are vector aU and vector aL, respectively, which are vector a1 and vector a2, respectively, when decomposed into orthogonal vectors. Since the upper and lower sidebands of the multiplex signal are expressed by vector bU and vector bL, respectively, their synthetic vector is b2, which is the only component to intersect with vector I1 orthogonally.

That is, when the main signal is synchronously detected by the carrier I1, quadrature distortion due to the vector a2, vector b2 components does not occur. Thus, the impairment by the multiplex signal to the existing television receiver performing video synchronous detection does not occur in principle.

Figure 4A:
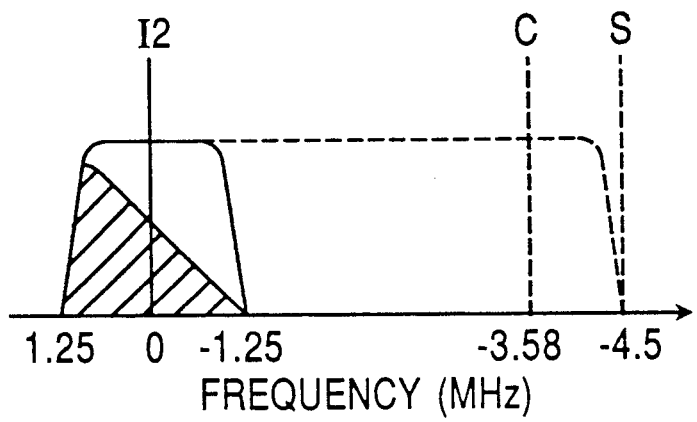
FIG. 4(a) is a spectral diagram showing the processing method of the multiplex signal processor at the reception side.
Figure 4B:
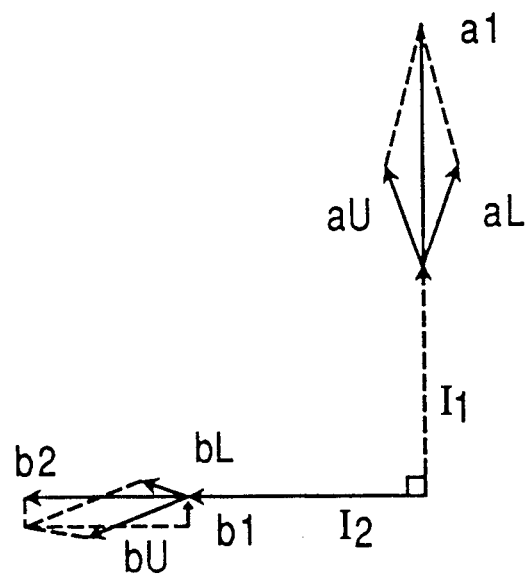
FIG. 4(b) is a vector diagram to explain the principle of the multiplex signal processor at the reception side.

Next, detection of the multiplex signal at the reception side is described below. The signal of the video intermediate frequency band which is the output of the tuner 522 is limited in band by a bandpass filter, as shown in FIG. 4(a), so that the main signal, that is, the video baseband signal, becomes double sideband. Its vector expression is shown in FIG. 4(b). Since the multiplex signal is a vestigial sideband, the upper and lower side bands are vector bU and vector bL, respectively, their synthetic vector is a1, which is the only component intersecting orthogonally with the vector I2.

That is, when the multiplex signal is synchronously detected by the carrier I2, quadrature distortion due to the vector a1, vector b1 components does not occur. Thus, only the multiplex signal components can be demodulated.

Figure 4C:
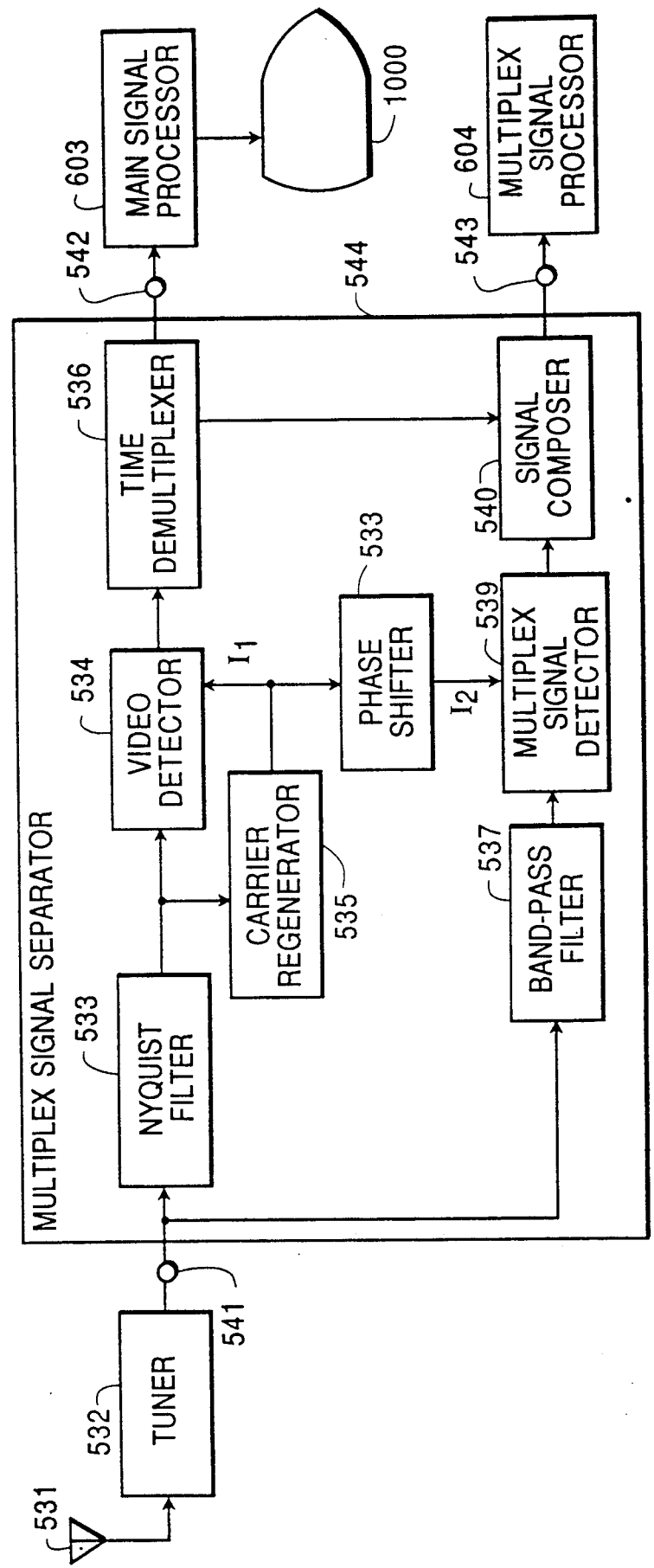
FIG. 4(c) is a block diagram showing the processing method of the multiplex signal processor at the reception side.

FIG. 4(c) shows an example of television multiplex signal processor for demodulating the multiplex signal as well as the main signal. The multiplexed signal transmitted from the transmission side is received by an antenna 531, converted in frequency into an intermediate frequency band by a tuner 532, and fed to a multiplex signal separator 544 through an input terminal 541 thereof. The fed signal is limited in the band by a Nyquist filter 533. The band-limited signal is fed to a video detector 534 and a carrier regenerator 535. In the carrier regenerator 535, the video carrier I1 for synchronous detection is regenerated. The band-limited signal is synchronously detected by the carrier I1 in the video detector 534, and fed to a time demultiplexer 536. In the time demultiplexer 536 the main signal and the first multiplex signal are separated. This processing is just the opposite to that of the time multiplexer 501 in the multiplex signal superposing circuit 513 at the transmission side. The first multiplex signal is fed into a signal composer 540 and the main signal, the baseband video signal, goes to an output terminal 542 of the multiplex signal separator 544.

The main signal is converted into, for example, R, G, B signals by a main signal processor 603, and displayed on a CRT screen 1000.

The output of the tuner 532 is band-limited also as shown in FIG. 4(a) by a bandpass filter 537. By the carrier I2 obtained by 90 degrees phase shifting the carrier I1 by a phase shifter 538 (that is, by the carrier I2 in the same phase as the carrier for multiplex signal modulation used at the transmission side), the band-limited signal is synchronously detected in a multiplex signal detector 539 to obtain the second multiplex signal. The second multiplex signal is composed into the original multiplex signal together with the first multiplex signal at the signal composer 540.

The main signal and the multiplex signal are usually correlated to each other, and both signals are separated from a signal source. One novel way to increase the vertical resolution is to use a progressive scanning camera as a signal source. In order to keep the transmission compatibility, the progressive scanning signal is once converted to an interlace scanning signal at a transmitter and converted again to the progressive signal at a receiver. One reason to use a progressive camera is its spot size which is small enough to increase the vertical resolution.

But more positive use of the progressive scanning camera is to transmit a difference signal between adjacent horizontal scanning lines, which is lost at a converter of the transmitter.

Figures 5, 6, 7A, 7B:
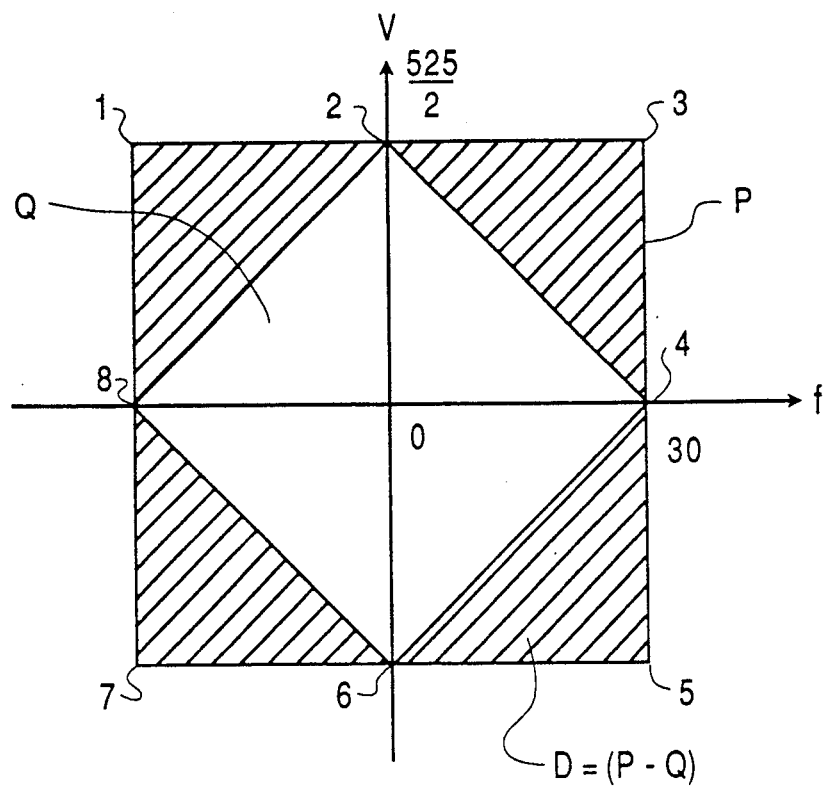
FIG. 5 is a 2-dimensional spectral diagram showing the progressive scanning signal and interlace scanning signal.
FIGS. 6 and 7(a) and 7(b) are 2-dimensional schemes of television signals showing the processing method of progressive to interlace scanning conversion at the transmission side of this invention.

FIG. 5 is a 2-dimensional spectrum of television signal, where the vertical axis shows vertical frequency $v$ and horizontal axis shows temporal frequency $f$. When the progressive scanning camera is used to pick up a picture, the frequency region of the output signal is a square Region P shown in FIG. 5. But conforming to the conventional NTSC format, we can transmit only a square Region Q surrounded by 2, 4, 6, and 8 in FIG. 5 without aliasing. To transmit the progressive scanning signal without aliasing, we have to filter it into Region Q from Region P. But to achieve high vertical resolution at the receiver, it is necessary to send the signal of Region D (D=P-Q) in FIG. 5 by an additional channel.

FIGS. 6 and 7(a)-7(b) show how to convert a progressive scanning signal to a interlace scanning signal at the transmitting end. In FIG. 6, each circle and each column means a line and a frame, respectively; therefore, the horizontal axis is temporal. Now we focus a line named f in the middle of this figure. When we are at line f, line e came just a frame ago, line b came just a line ago, and line x will come in just a frame. The frame rate is assumed to be 60 Hz in this example. We make a new line F according to the following equation:

$$F = f/2 + (b+e+x+i)/8 \quad (1)$$

By following this signal processing, we can convert a line f in Region P to a line F in Region Q. By applying the same way to lines c, j, g, etc. and discarding lines e, b, i, x, etc., we obtain the 2:1 interlace signal shown in FIG. 7(a). In order to extract the signal of Region D mentioned earlier, we have a new line X from a line x using the following equation:

$$X = x - (C+F+G+J)/4 \quad (2)$$

In this equation C, F, G, and J are lines obtained by the previous equation. By applying the same way to lines a, b, d, e, etc., we have new lines A, B, D, E, etc. shown in FIG. 7(b). After these signal processing, lines F, C, G, J etc. shown in FIG. 7(a) are transmitted by the conventional NTSC channel and lines A, B, D, E, etc. are transmitted through an augmentation channel. When we recover the original progressive scanning signal at the receiving end, we obtain line x from the following equation;

$$x = X + (C+F+G+J)/4 \quad (3)$$

As for line f, we use lines F, b, e, x, i and the following equation, $$f = 2F - (b+e+x+i)/8 \quad (4)$$

By applying the same method to lines C, G, J, and so on, we can recover all lines and form the original progressive scanning signal.

Figure 8:
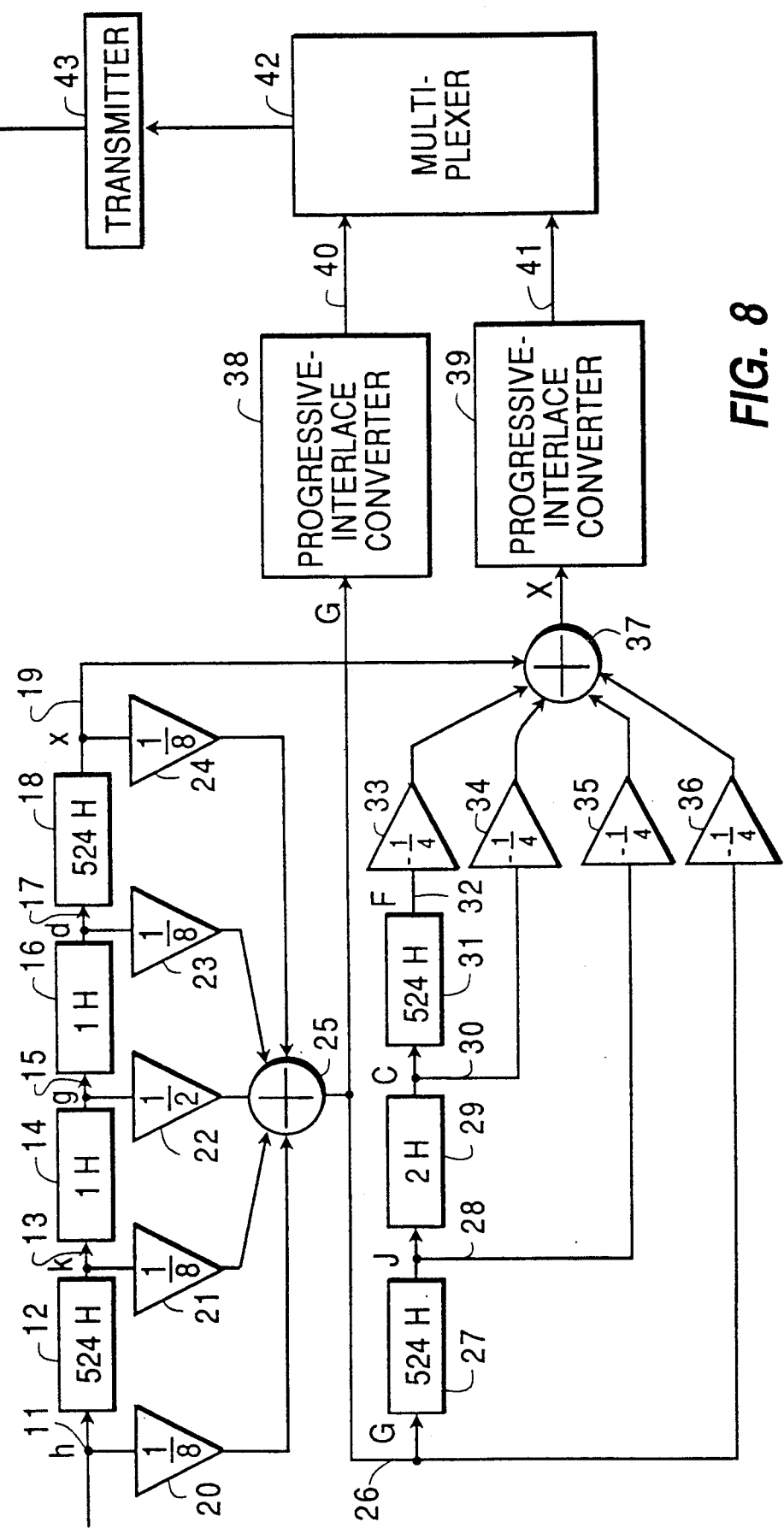

FIG. 8 is a block diagram showing a television multiplex signal processor at the transmission side used to obtain the interlace signal and the additional signal in Region D as an embodiment of this invention.

The progressive scanning signal is fed to an input terminal 11, and passes through delay lines 12, 14, 16, and 18. These delay lines have a 524 H or 1 H delay time (H: Horizontal scanning time). From terminals 11, 13, 15, 17, and 19, signals corresponding to lines h, k, g, d, and x in FIG. 6 are obtained at the same time. These signals are fed into coefficient multipliers 20, 21, 22, 23, and 24, and multiplied by coefficients of ⅛, ⅛, ½, ⅛, and ⅛, respectively. The outputs of these multipliers are all fed into an accumulator 25 by which a signal corresponding to line G in FIG. 7(a) is obtained. This processing of multiplying and accumulation follows the equation (1). This signal G is fed to a progressive-interlace converter 38 and converted from a progressive signal to an interlace signal. The actual processing of converter 38 is time-axis expansion. On the other hand, the signal corresponding to the line G is fed into a point 26, and signals corresponding to lines G, J, C, and F are obtained by delay lines 27, 29 and 31 at points 26, 28, 30, and 32. These signals are again fed to coefficient multipliers 33, 34, 35 and 36. At each multiplier the input signal is multiplied by a coefficient $-\frac{1}{4}$. At an accumulator 37, these multiplied signals and the signal of line x are all accumulated together to produce a signal X, which is an input to a progressive-interlace converter 39. At output terminals 40 and 41, interlace signals G and X, which are corresponding to Regions Q and D respectively, are obtained. These signal processings follow the equations (1) and (2). The terminal 40 may be connected to the input terminal 501 in FIG. 2.

Figure 9:
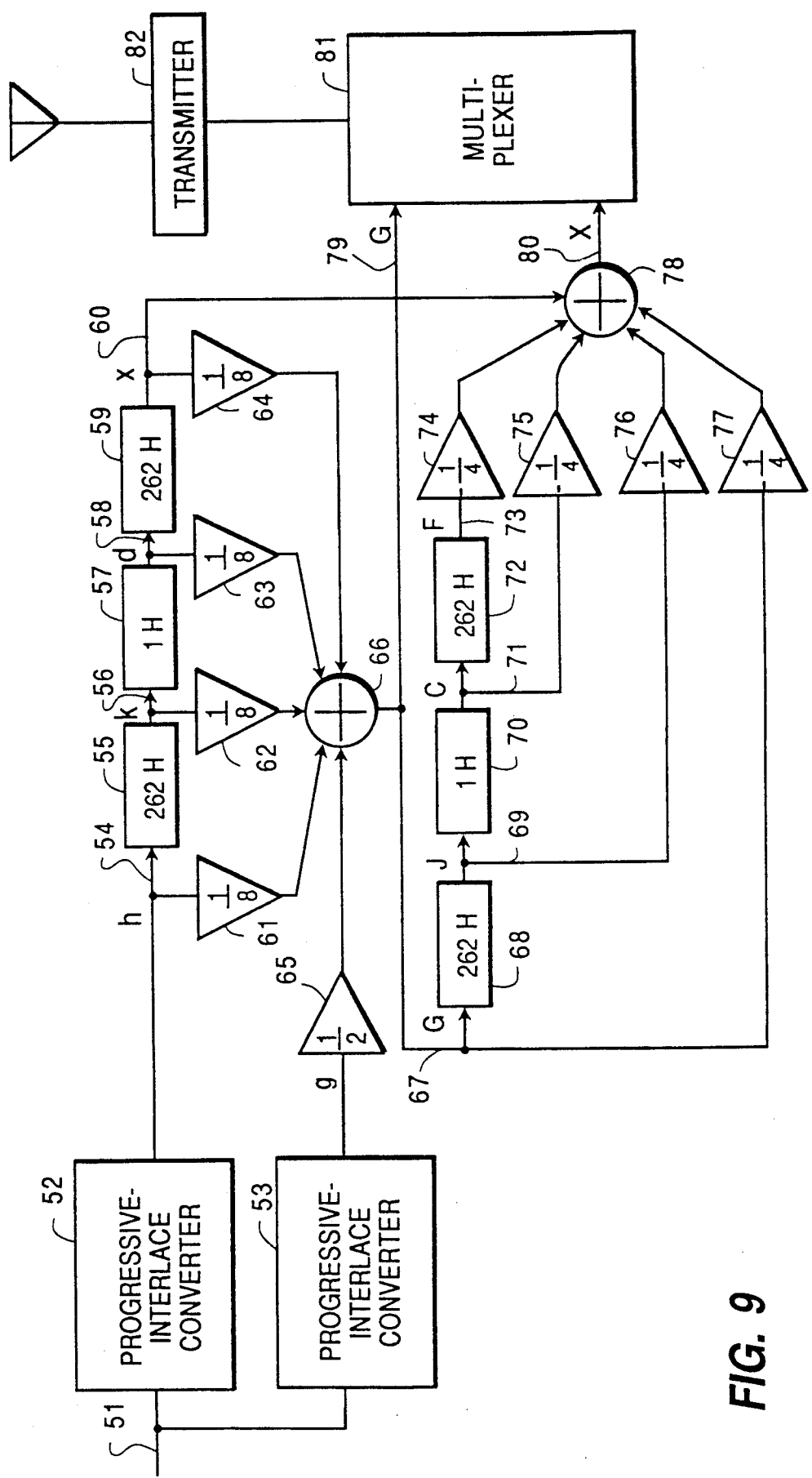

FIG. 9 is a block diagram showing another television multiplex signal at the transmission side used to obtain the interlace signal and the additional signal in Region D as an embodiment of this invention. This diagram shows the same signal processing as FIG. 8 but the difference is the position of the two progressive-interlace converters. In FIG. 9, these two converters are placed at the beginning of the signal processing and convert the progressive scanning signals to the interlace scanning signals before the processings according to the equations (1) and (2). Therefore, the delay time of the delay lines in FIG. 9 is just half of that in FIG. 8.

Figure 10:
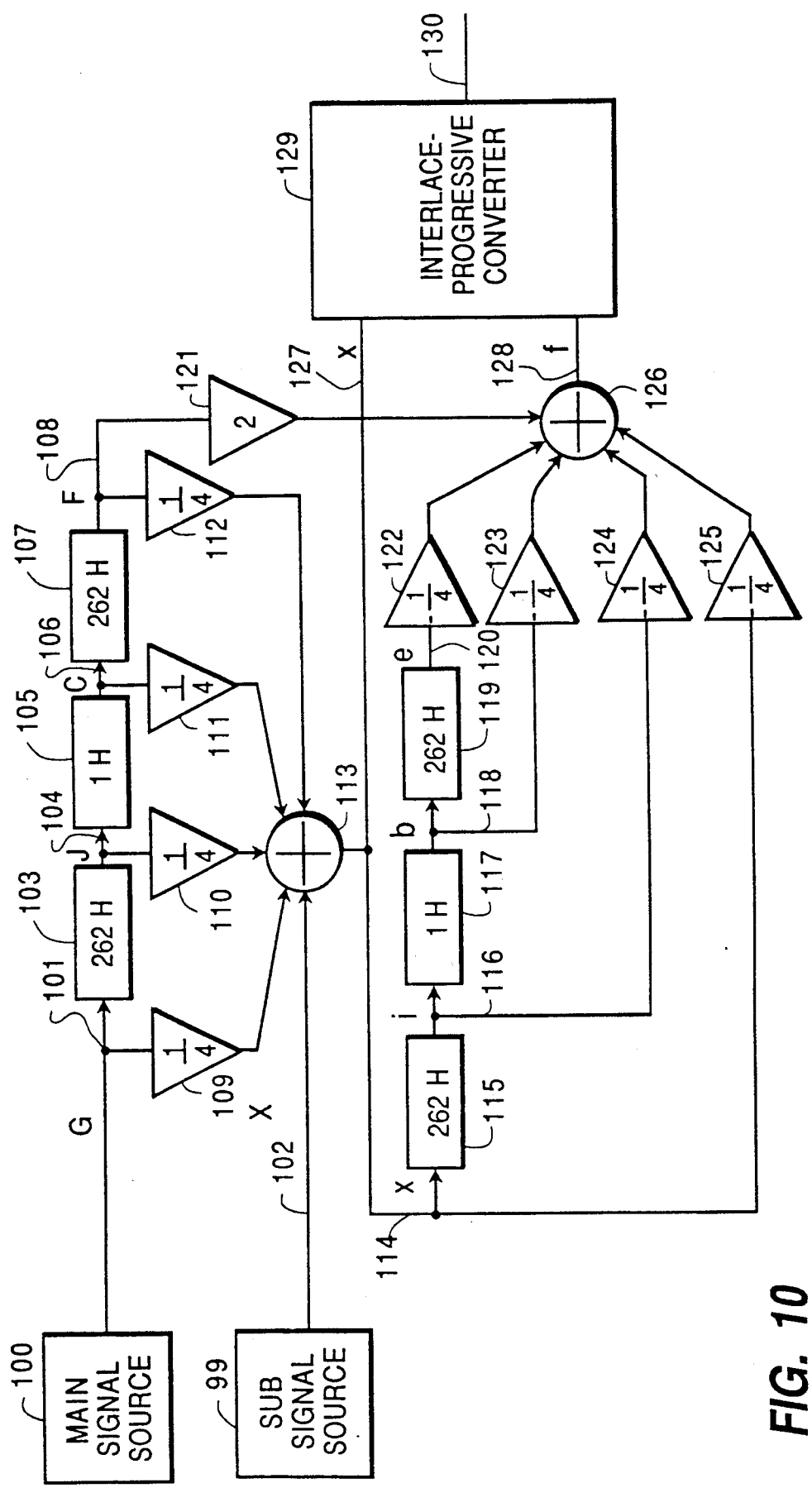
Figure 12A:
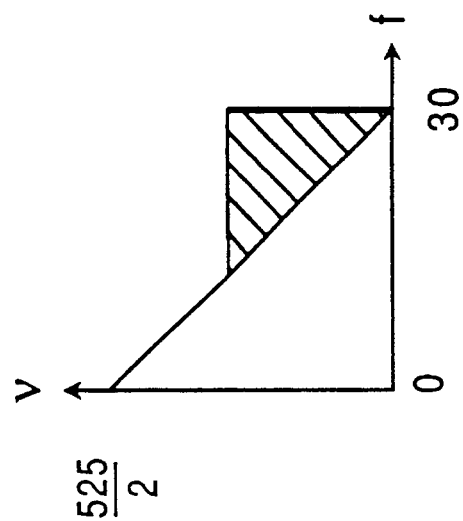
FIGS. 12(a)–12(a) are 2-dimensional frequency spectrums of television signal showing the region to be transmitted as a way to embody this invention.
Figure 12B:
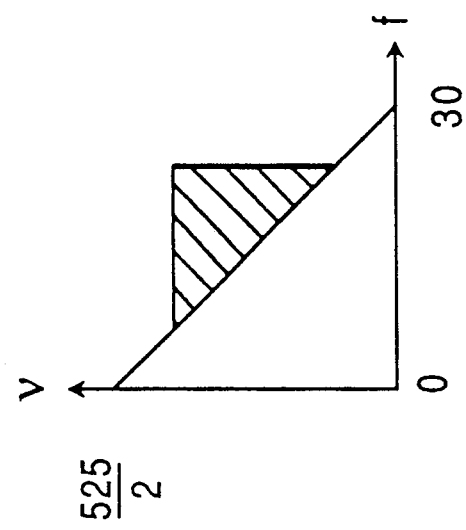
Figure 12C:
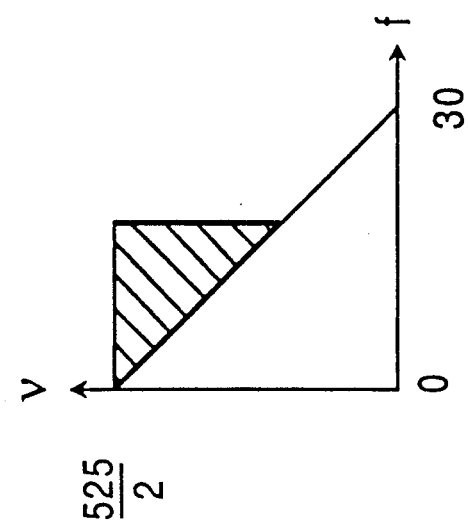

FIG. 10 is a block diagram showing a television multiplex signal processor at the receiving side used to obtain the progressive signal of Region P, such as lines g and x from lines G and X, as an embodiment of this invention. In this figure, an interlace scanning signal to an input terminal 101 is fed to a series of delay lines to obtain, at points 101, 104, 106 and 108, signals which are corresponding to lines G, J, C and F shown in FIG. 7(a), respectively. These signals are multiplied by coefficients, which are all $\frac{1}{4}$, by multipliers 109, 110, 111 and 112. At an accumulator 113, another input signal at a terminal 102 and these multiplied signals are all accumulated and a signal corresponding to x in Region P is obtained at a point 127.

In the lower part of FIG. 10, this signal corresponding to x is fed to another series of delay lines 115, 117 and 119, and signals corresponding to lines x, i, b and e are obtained at the same time at points 114, 116, 118 and 120. These signals are multiplied by coefficients, which are all $(-\frac{1}{4})$, by multipliers 122, 123, 124 and 125. On the other hand, the signal corresponding to line F is multiplied by a coefficient 2 by a multiplier 121. At an accumulator 126, these signals are accumulated and a signal corresponding to line f in Region P is obtained at a point 128. At the last portion of this figure, the signals which relate to lines x and f are fed to an interlace-progressive converter 129 and converted to a progressive scanning signal. An point 130 is a output terminal of this signal.

In order to transmit the signal corresponding to Region D in FIG. 5, one can use an additional 6 MHz TV channel, or smaller bandwidth channel after applying band compression method to it. Alternatively, it is possible to use 'Fukinuki Hole' or quadrature modulation of the video carrier to transmit a portion of the signal in Region D. In the case of using 'Fukinuki Hole', one must restrict the region for transmitting to the area shown in FIG. 11.

When we use 'Fukinuki Hole' for transmitting side panels instead of higher frequency component of luminance or chrominance signal, the original signal occupying the first and third quadrants must be removed to prevent crosstalk between them. In order to remove the signal which horizontal frequency is between 1.5 MHz and 4.2 MHz, the next processing is performed as shown in FIG. 11.

$$Z1=Z2=(Y1+Y2)/2 \quad (6)$$

Thus, one can reduce the diagonal resolution from Region Q shown in FIG. 5. Furthermore, a signal corresponding to a line X will be transmitted. Here X is:

$$X=(Y1-Y2)/2 \quad (7)$$

At the receiving end, by processing as:

$$Y1=Z1+X \quad (8)$$

$$Y1=Z1-X \quad (9)$$

Y1 and Y2 can be reproduced. As mentioned, the horizontal frequency of the signal of line X is 1.5 MHz to 4.2 MHz. Therefore the bandwidth of 2.7 MHz is required to be transmitted. But for two lines Z1 and Z2, only one line X, is needed. Therefore the bandwidth of the signal of line X may be split into two parts, 1.5 MHz to 2.5 MHz (X1), and 2.5 MHz to 3.5 MHz (X2), and each part can be transmitted with each line, Z1 or Z2. Both X1 and X2 can be transmitted by quadrature modulation of the video carrier, because their bandwidth is 1 MHz. Thus, the diagonal resolution can be recovered at the receiving end with little degradation to reconstruct lines Y1 and Y2 from the received Z1, Z2, X1 and X2.

Figure 13:
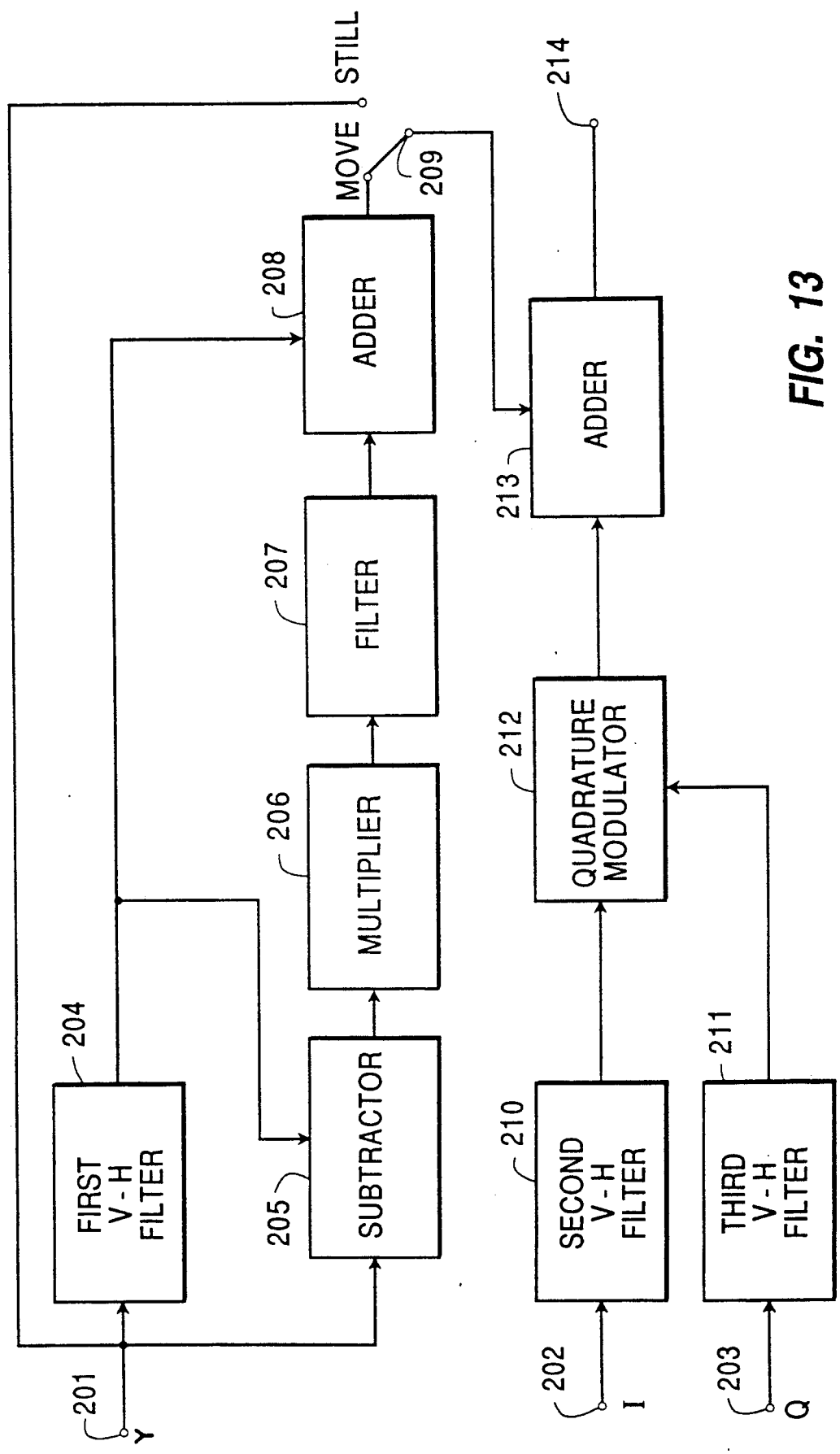
Figure 15:
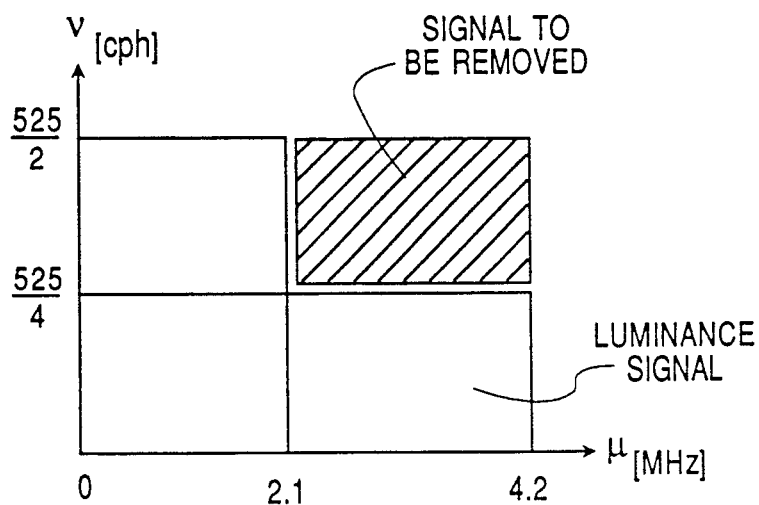
FIG. 15 is a 2-dimensional frequency spectrum of television signal showing the diagonal region to be removed when eliminating crosstalk between luminance and chrominance signals.

FIG. 13 is a block diagram showing still another television multiplex signal processor at the transmission side as an embodiment of this invention. In this figure, the luminance signal is fed to an input terminal 201, and a wideband chrominance signal I and a narrowband chrominance signal Q are fed into input terminals 202 and 203, respectively. The luminance signal is band limited by a first vertical-horizontal (V-H) filter 204 by removing the region of horizontally 2.1 MHz to 4.2 MHz and vertically above 525/4 cycle per height. But, these V-H filter is not limited to this characteristics. This V-H filter is realized, for example, as a combination of horizontal bandpass filter and vertical bandpass filter. An example of the V-H filter characteristic is shown in FIG. 15, where vertical and horizontal axes show their frequencies and units are cph and MHz. In this figure, the region with diagonal lines is removed and transmitted as a multiplex signal. In FIG. 13, this multiplex signal is obtained as the output of a subtractor 205, or alternatively as a direct output of the mentioned first V-H filter 204. The multiplex signal is fed to a multiplier 206 and multiplied by a carrier fa and converted in frequency. This converted signal is fed to a filter 207 and undesired bandwidth is removed to be the "Fukinuki Hole". In an adder 208, the output signal from the first V-H filter 204 and the signal from the filter 207 are added. At a switch 209, this output from the adder and the output from the first V-H filter 204 are switched according to the moving information of each pixel, for example. In other words, the input luminance signal is selected for a still or near still pixel and the output from the adder 208 is selected for a moving pixel. As for the chrominance signal, I and Q signals are filtered by a second V-H filter 210 and the third V-H filter 211, respectively, and quadrature modulated by a quadrature modulator 212 in the same way as the conventional NTSC encoder. A modulated chrominance signal, which is an output of the quadrature modulator 212, and the output luminance signal from the switch 209 are added by an adder 213. A composite television signal from the adder 213 is obtained at an output terminal 214. This composite television signal is, for instance, amplitude modulated and transmitted from an antenna.

Figure 17:
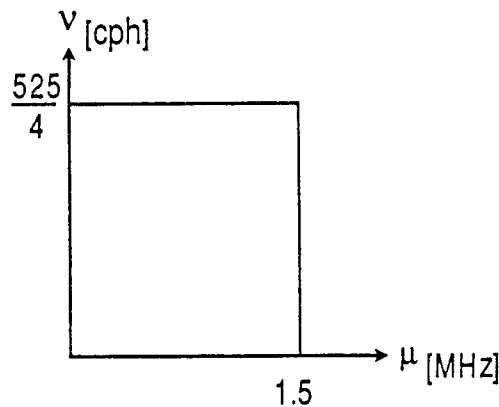
FIGS. 17 and 18 are 2-dimensional frequency spectrum of the chrominance signals.
Figure 18:
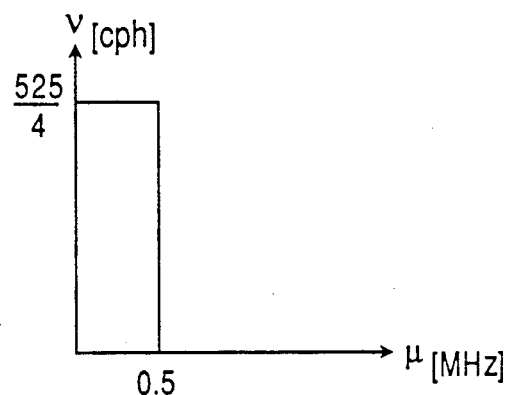

FIG. 17 and FIG. 18 are examples of the frequency spectrum of the second and third V-H filter, respectively. As explained above, when a still picture occurs, no special processing, such as removing the diagonal region, will be performed. The reason is that the chrominance and luminance signals are perfectly separated without crosstalk by using frame memories at the receiving end.

Figure 20:
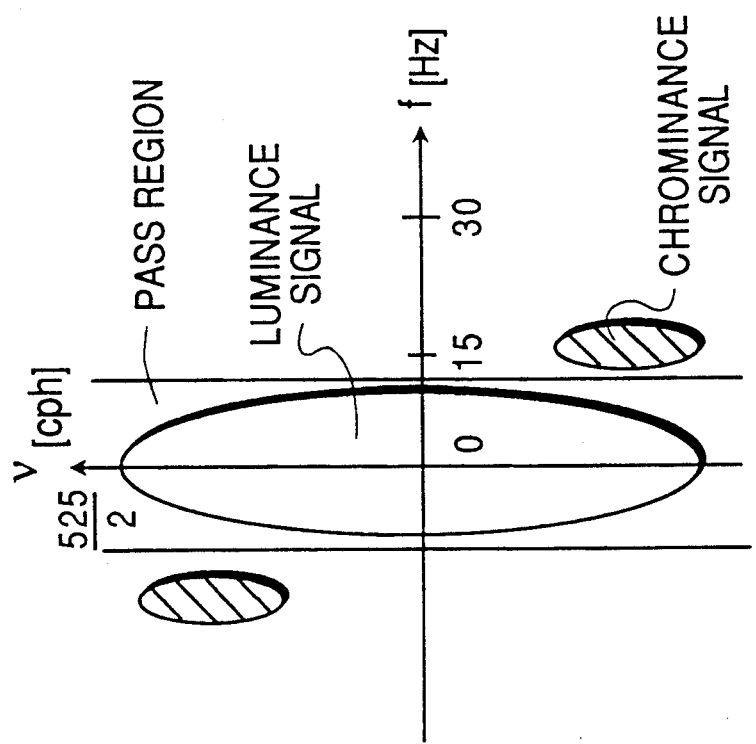
FIG. 20 is a 2-dimensional frequency spectrum of a still picture showing the easy separation of the luminance and chrominance signals.

FIG. 20 shows this reason, where the luminance signal lies in the region surrounded by ±15 Hz lines and ±525/2 cph lines, and the chrominance signal lies outside this region. Therefore, as shown in FIG. 13, the switch 209 selects the input luminance signal for a still or near still pixel and the output signal from the adder 208 for a moving pixel. But, for the receiver without the frame Y/C separator, the diagonal region may be removed even for a still pixel.

Figure 16:
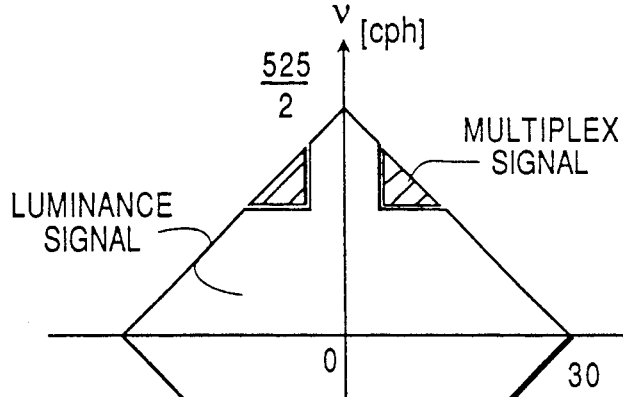
FIG. 16 is a 2-dimensional frequency spectrum of luminance signal showing the characteristics of a vertical-horizontal filter.

FIG. 16 shows a 2-dimensional frequency spectrum of the luminance signal which is transmitted as in FIG. 13. In this figure, f is the temporal frequency and ν is the vertical frequency. The third axis coming from the face of the paper to a viewer is horizontal frequency and this 2-dimensional section is that of 2.1 MHz to 4.2 MHz of the horizontal frequency. The region with diagonal lines shows the multiplex signal. The multiplex signal is converted in frequency by the multiplier 206 shown in FIG. 13. By this multiplier, the carrier fa is used for the original multiplex signal to convert it so as to lie in the "Fukinuki Hole".

Figure 19:
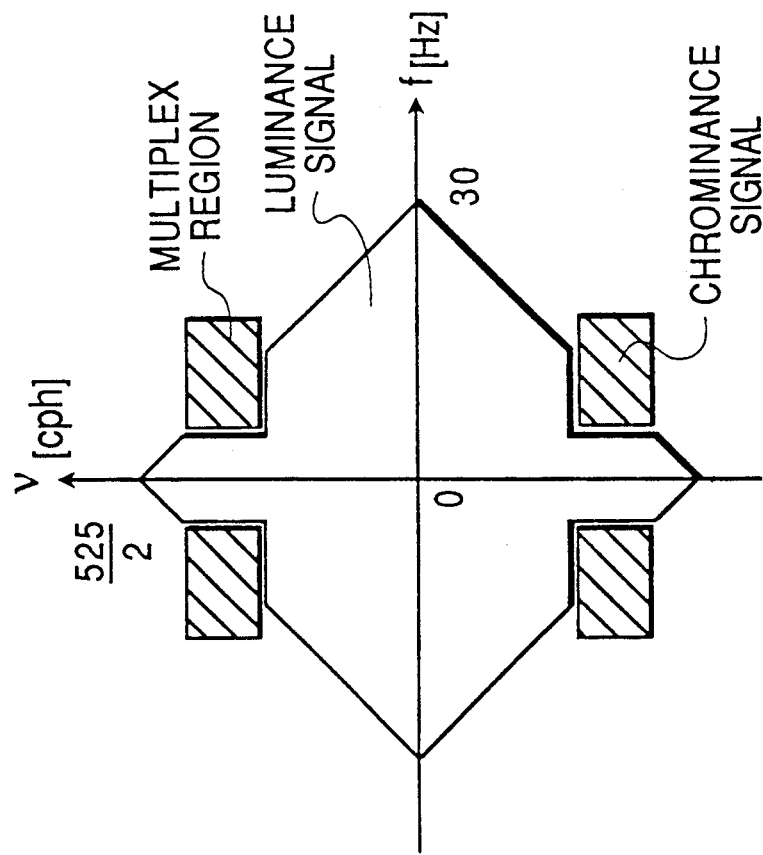
FIG. 19 is a 2-dimensional frequency spectrum of a television signal showing the region of the multiplex signal and chrominance signal.

FIG. 19 shows a 2-dimensional frequency spectrum of the luminance signal, where the "Fukinuki Hole" exists in both the first and third quadrants and chrominance signal lies in the second and fourth quadrants.

Figure 14:
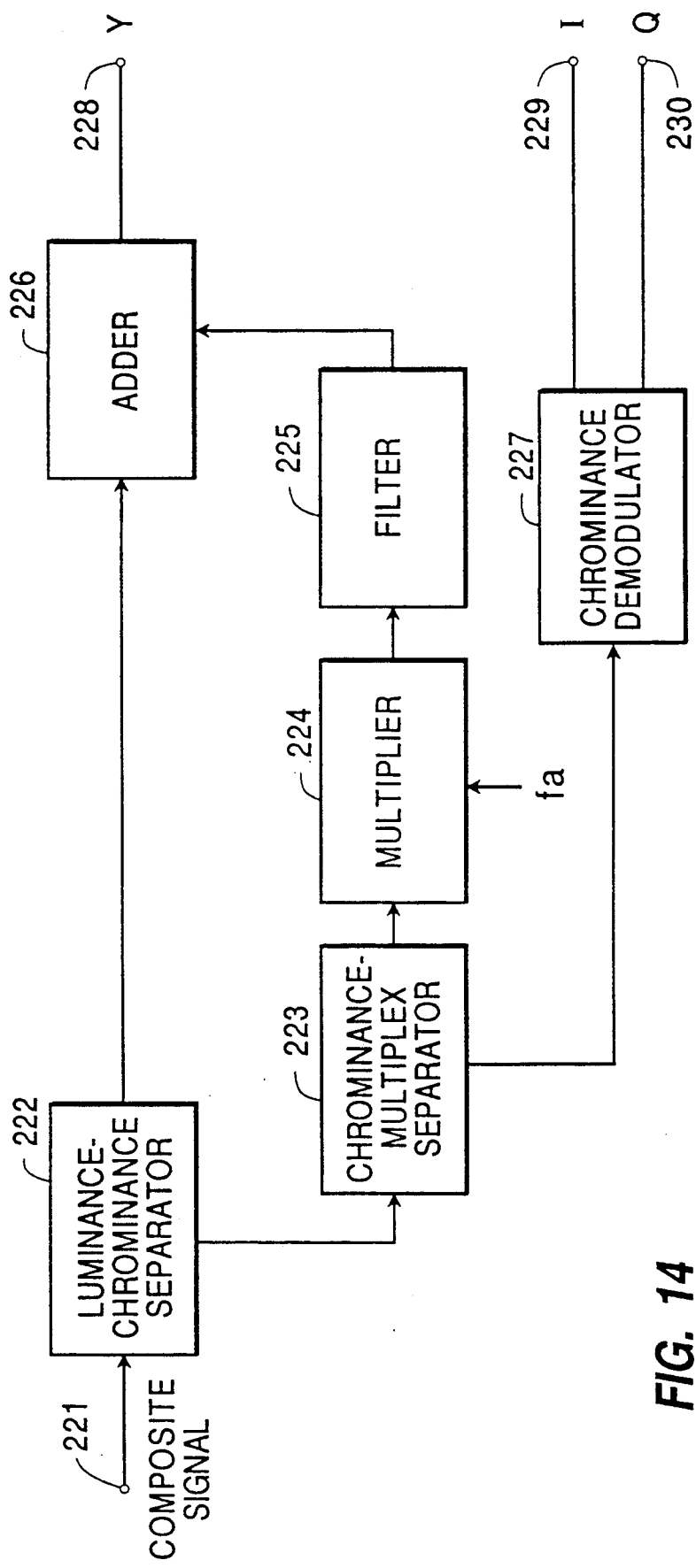

FIG. 14 is a block diagram showing another television multiplex signal processor at the receiving side in accordance with an embodiment of this invention. In this figure, 221 is an input terminal of a composite television signal, and 228, 229 and 230 are output terminals of a demodulated luminance signal, a demodulated wideband chrominance signal I, and a demodulated narrowband chrominance signal Q, respectively. The input composite signal is first fed to a luminance-chrominance separator 222 and separated into luminance and chrominance signals. This chrominance signal includes a chrominance signal and a multiplex signal and is fed to a chrominance-multiplex separator 223. One of outputs from the separator 223, which is a multiplex signal, is fed to a multiplier 224 and multiplied by a carrier fa. After passing through a filter 225 in order to remove the undesired bandwidth which arises in the multiplier, the multiplex signal (the diagonal region of luminance signal which is separated at the transmitting side) is added by an adder 226 with a baseband luminance signal from the separator 222 to become the original luminance signal Y. On the other hand, another output from the separator 223, which is a chrominance signal, is fed to a chrominance demodulator 227 and demodulated into I and Q signals. The chrominance-multiplex separator 223 is designed to separate the multiplex signal in the first and third quadrants and the chrominance signal in the second and fourth quadrants in FIG. 19. This separator can be realized using field memories.

Thus, owing to the multiplexing in the diagonal region of the luminance signal with the "Fukinuki Hole", the crosstalk between chrominance and luminance signals never happens at the receiving end, and the diagonal region can be recovered to form the original luminance signal. In other words, one can receive the complete luminance signal without crosscolor or dot crawling. When this multiplexed television signal is received by the conventional television receiver, both the multiplex signal and the modulated chrominance signal are demodulated as a chrominance signal, but one can hardly detect any degradation of chrominance signal because the demodulated phase of the multiplex signal produces alternate colors without any visibility. It proves that there is no interference from the multiplex signal to the conventional television receiver.

FIG. 21 is a block diagram showing still another television multiplex signal processor at the transmission side in accordance with an embodiment of this invention. FIG. 22 is a block diagram showing still another television multiplex signal processor at the receiving side in accordance with an embodiment of this invention. These block diagrams include time-compression at the transmitting end and time-expansion at the receiving end. In FIG. 21, 271 is an input terminal of a luminance signal Y, and 272 and 273 are input terminals of wideband and narrowband chrominance signals I and Q. These Y, I and Q signals are introduced to time-compression circuits 274, 275 and 276, and then to horizontal filters 277, 278 and 279. The time-compressed chrominance signals are modulated in quadrature by a quadrature modulator 281, and added to the time-compressed luminance signal by an adder 280 to form a composite television signal. In FIG. 22, a composite television signal inputted through an input terminal 283 is fed to a Y/C separator 284. One output from the Y/C separator is a luminance signal Y and the other is a modulated chrominance signal C. The modulated chrominance signal C is fed to a chrominance demodulator 285 and a wideband chrominance signal I and a narrowband chrominance signal Q are separated. These Y, I and Q signals are respectively introduced to time-expansion circuits 286, 287 and 288. As described above, since this multiplex signal processor includes time-expansion at the receiving end, dot crawling, which is crosstalk from the chrominance signal to the luminance signal, includes low frequency components and is visible than that of the normal crawling. The bandwidth limiting by horizontal filters at the transmitting end, as shown in FIG. 16 for the luminance signal, and FIG. 17 and FIG. 18 for chrominance signals, can eliminate the crosstalk just explained before. Even when the multiplex signal processor at the transmission end includes time-compression circuits, these horizontal filters are useful for eliminating annoying dot crawling at the receiving end.

Figure 23A:
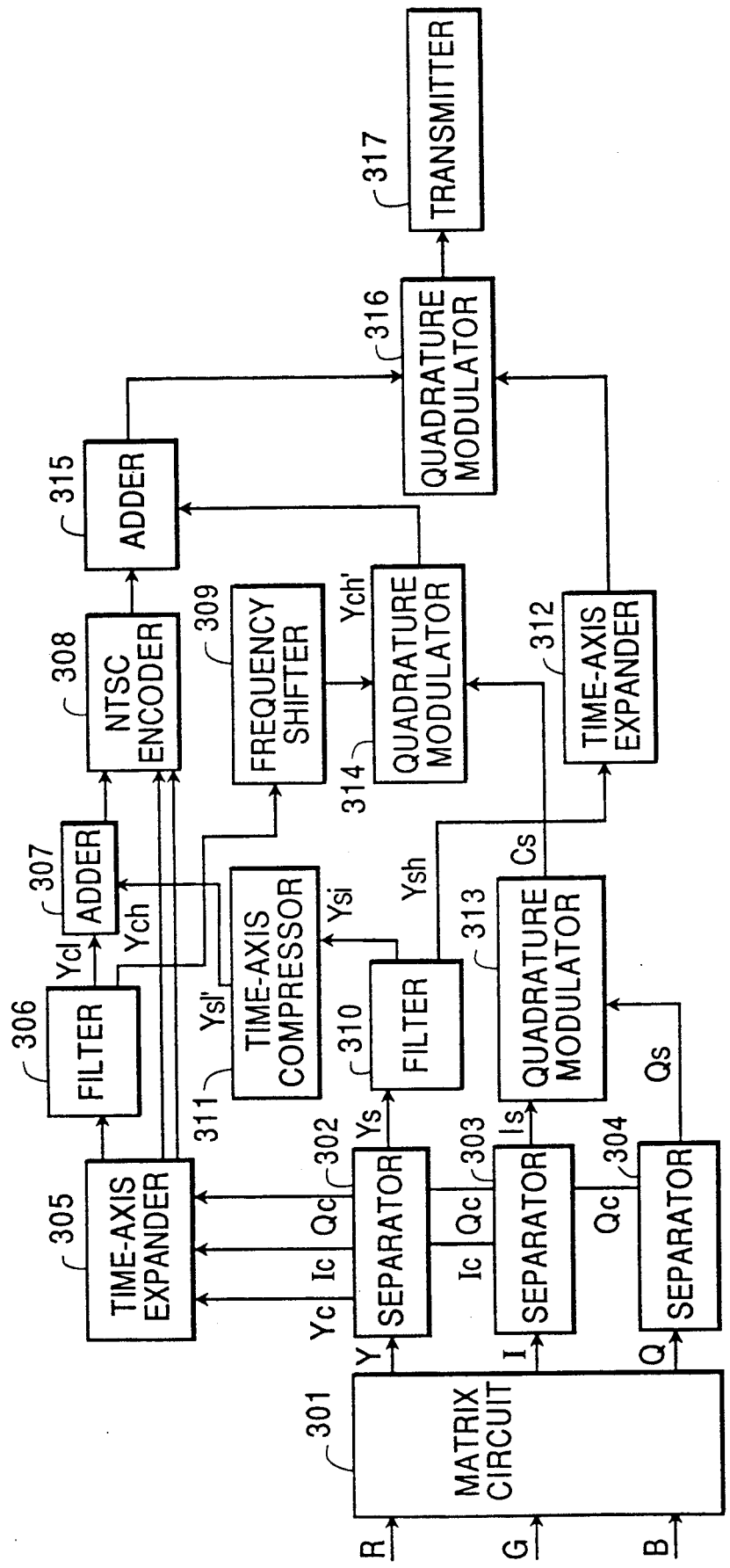

FIG. 23(a) is a block diagram showing another television multiplex signal processor at the transmission side. In FIG. 23(a), R, G and B signals with an aspect ratio of 16:9 and 7 MHz bandwidth are fed into a matrix circuit 301 and are converted to a luminance signal Y, and chrominance signals I and Q. These signals are fed into three separators 302, 303 and 304 and a center panel, which is three quarters of the whole picture, and side panels, which are the rest of it, are split. Three center panels Yc, Ic, Qc, which come from the three separators, are fed to a time-axis expander 305 and are time-expanded to 4/3, then the bandwidth of the luminance signal becomes 5.2 MHz, whereas the bandwidths of the chrominance signals are 1.5 MHz and 0.5 MHz. The center panel of the luminance signal is then fed to a filter 306 and separated into a low frequency component Yc1, whose bandwidth is DC to 4.2 MHz, and a high frequency component Ych, whose bandwidth is 4.2 MHz to 5.2 MHz. The low frequency component of the luminance signal of the center panel is fed to an adder 307, and the output of this adder and the chrominance signal of the center panel Ic and Qc are all fed into an NTSC encoder 308 and encoded into an NTSC composite signal. The high frequency component of the luminance signal of the center panel is fed to a frequency shifter 309 and converted in frequency to a bandwidth of DC to 1.0 MHz to be called Ych'. On the other hand, the luminance signal of the side panels Ys is fed to a filter 310 and separated into a low frequency component Ys1, whose bandwidth is DC to 800 KHz, and a high frequency component Ysh, whose frequency is over 800 KHz. The low frequency component Ys1 is fed into a time-axis compressor 311 and time compressed by 5, and then superposed at the hidden part of overscanning of a receiver and a front porch of the synchronous signal by the adder 307. The high frequency component of the luminance signal of the side panels Ysh is fed to a time-axis expander 312 and time-expanded by 4, then its frequency is 200 KHz to 1.75 MHz. A part of this time-expanded signal, whose bandwidth is 200 KHz to 1.2 MHz, can be transmitted by quadrature modulation of the video carrier. The chrominance signal of the side panels, Is and Qs, are fed to a quadrature modulator 313 and modulated to form a modulated chrominance signal Cs. This modulated chrominance signal Cs and the frequency shifted high frequency component of the luminance signal of the center panel Ych' are fed into a quadrature modulator 314 and modulated by a 3.1 MHz carrier, for example. If one choosees this carrier as having opposite phase line by line and opposite phase at 262nd line in next field, the quadrature modulated signal would exist in the first and third quadrants in a 2-dimensional spectrum figure, "Fukinuki Hole". The output of the quadrature modulator 314 is added to the NTSC composite signal by an adder 315, and the output of this adder is fed into a quadrature modulator 316 and modulated by the multiplex signal from the time-axis expander 312.

Especially, if one can modulate the carrier by the high frequency component of the luminance signal of the center panel Ych' as the lower sideband and the modulated chrominance signal of the side panels Cs as the upper sideband in a carrier suppression fashion, there arises a merit to reduce interference to the conventional television receiver because the former has a correlation with the main NTSC composite signal. As most of the conventional receiver use a narrowband chrominance modulator, interference caused by the lower sideband of the "Fukinuki Hole" becomes dot crawling which moves down and is very annoying. In this sense, it is desirable to modulate the carrier in the "Fukinuki Hole" as positioning the correlated signal in the lower sideband.

Figure 23B:
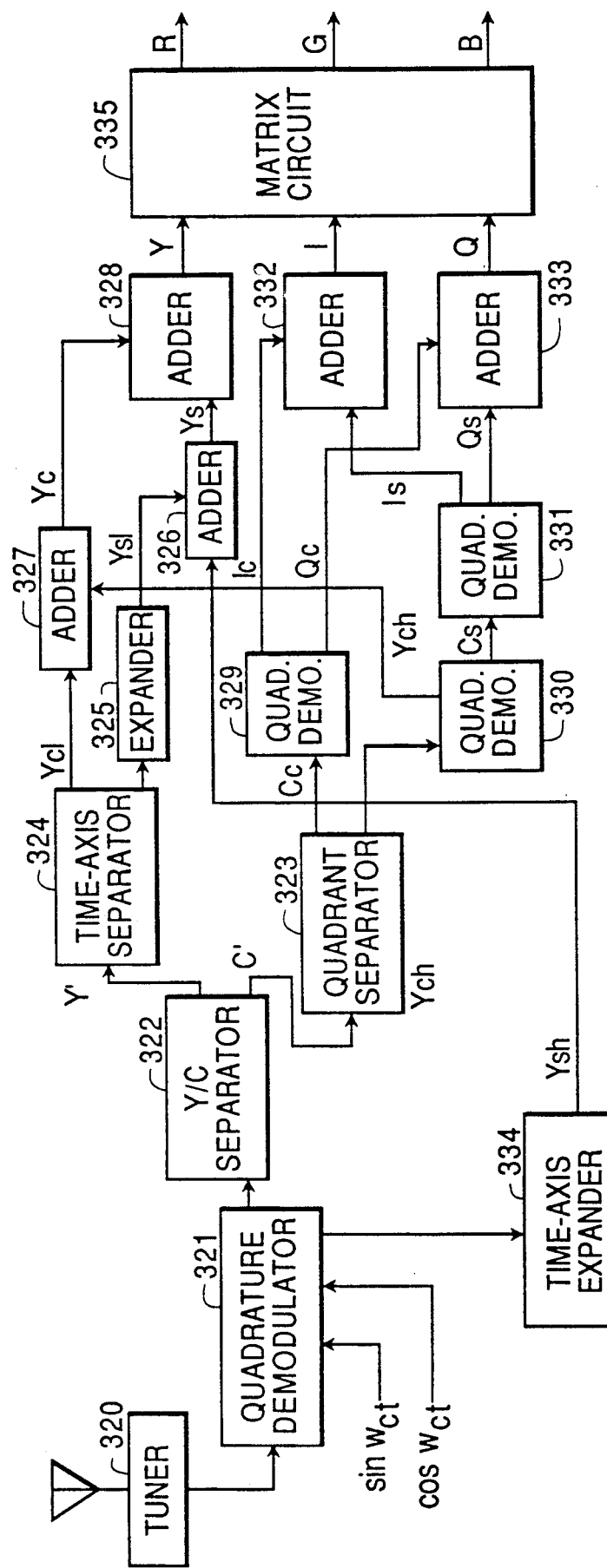

FIG. 23 (b) is a block diagram showing another television multiplex signal processor at the receiving side. In this figure, the input signal is a frequency shifted IF video signal from a tuner 320. A quadrature modulator 321 is a video detector and demodulates a video signal. In this quadrature modulator, the input IF signal is demodulated by regenerated carriers $\sin\omega ct$ and $\cos\omega ct$, and then a main NTSC composite signal and a multiplex signal are obtained. The detected main signal is next fed to a Y/C separator 322, and the multiplex signal is fed into a time-axis expander 334 and converted to high frequency component of the luminance signal of the side panels. The Y/C separator has 3-dimensional filter for a still picture and 2-dimensional filter for a moving picture to separate luminance signal Y' and modulated chrominance signal C'. This modulated chrominance signal C' includes a chrominance signal and a multiplex signal in the first and third quadrants, and is fed to a quadrant separator 323 to be converted to a chrominance signal of the center panel Cc and a multiplex signal. The multiplex signal is modulated by a carrier, for instance, of a frequency of 3.1 MHz, and therefore introduced to a quadrature demodulator 330, where a high frequency component of the luminance signal of the center panel Ych and a modulated chrominance signal of the center panel Cc are obtained. The separated modulated chrominance signal of the center panel Cc from the quadrant separator 323 is fed to a quadrature demodulator 329 and chrominance signals Ic and Qc are reproduced. This processing is exactly the same as the normal NTSC decoder. The modulated chrominance signal of the side panels Cs is fed into a quadrature demodulator 331 and chrominance signals Is and Qs are reproduced.

On the other hand, one of the outputs from the Y/C separator 322, Y', is fed to a time-axis separator 324 and a low frequency component of the luminance signal of the side panels Ys1', which is superposed at the hidden portion of overscanning of a receiver and a front porch of synchronous signal, is separated, and at the same time, the rest of it is separated and expanded in time by 4/3 to be a low frequency component of the luminance signal of the center panel Yc1. This Yc1 is fed to an adder 327, added to the high frequency component of the luminance signal of the center panel Ych, and becomes a luminance signal of the center panel Yc. The low freqency component of the luminance signal of the side panels Ys1' is fed to an expander 325 and time-expanded to Ys1, and then added to the high frequency counterpart Ysh from the time-axis expander 334 by an adder 326 to be Ys. These signals, luminance and chrominance signals of the, center and side panels, are combined by adders 328, 332 and 333 to be Y, I and Q. As the last stage, at a matrix circuit 335, these Y, I and Q signals are converted to R, G and B signals in order to display on a CRT, for example.

Figure 24B:
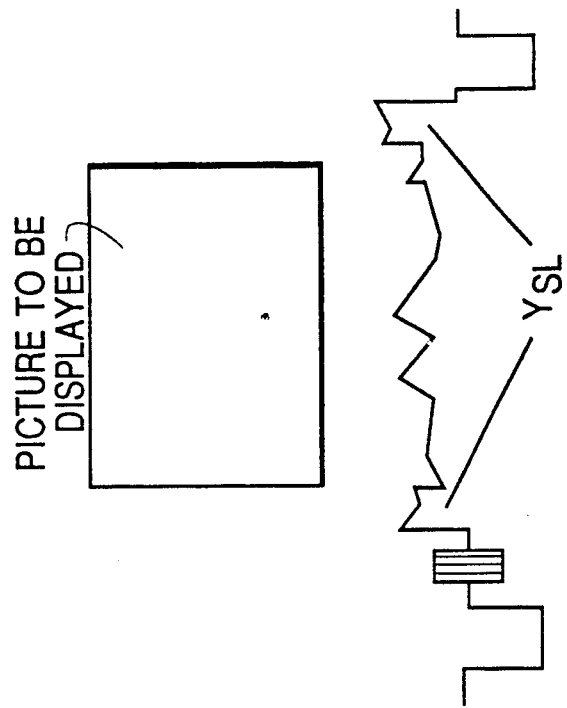
FIGS. 24(a)–24(b) and 26(a)–26(b) are frequency spectrum and waveform diagrams of a television signal.
Figure 24A:
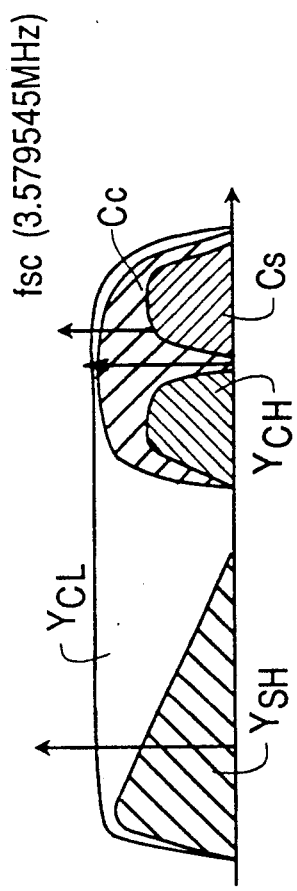

As explained above and shown in FIGS. 24(a)-24(b), the low frequency component of the luminance signal of the side panels Ys1 is superposed at the hidden portion of overscanning of a receiver and front porch of the synchronous signal, the high frequency component of the luminance signal of the side panels Ysh is transmitted by quadrature modulation of the video carrier, and the chrominance signal of the side panels Cs and the high frequency component of the luminance signal of the center panel Ych are transmitted by the "Fukinuki Hole". The main merit of this transmission is to reduce interference to the conventional receiver by transmitting signals in the most appropriate way.

Figure 25A:
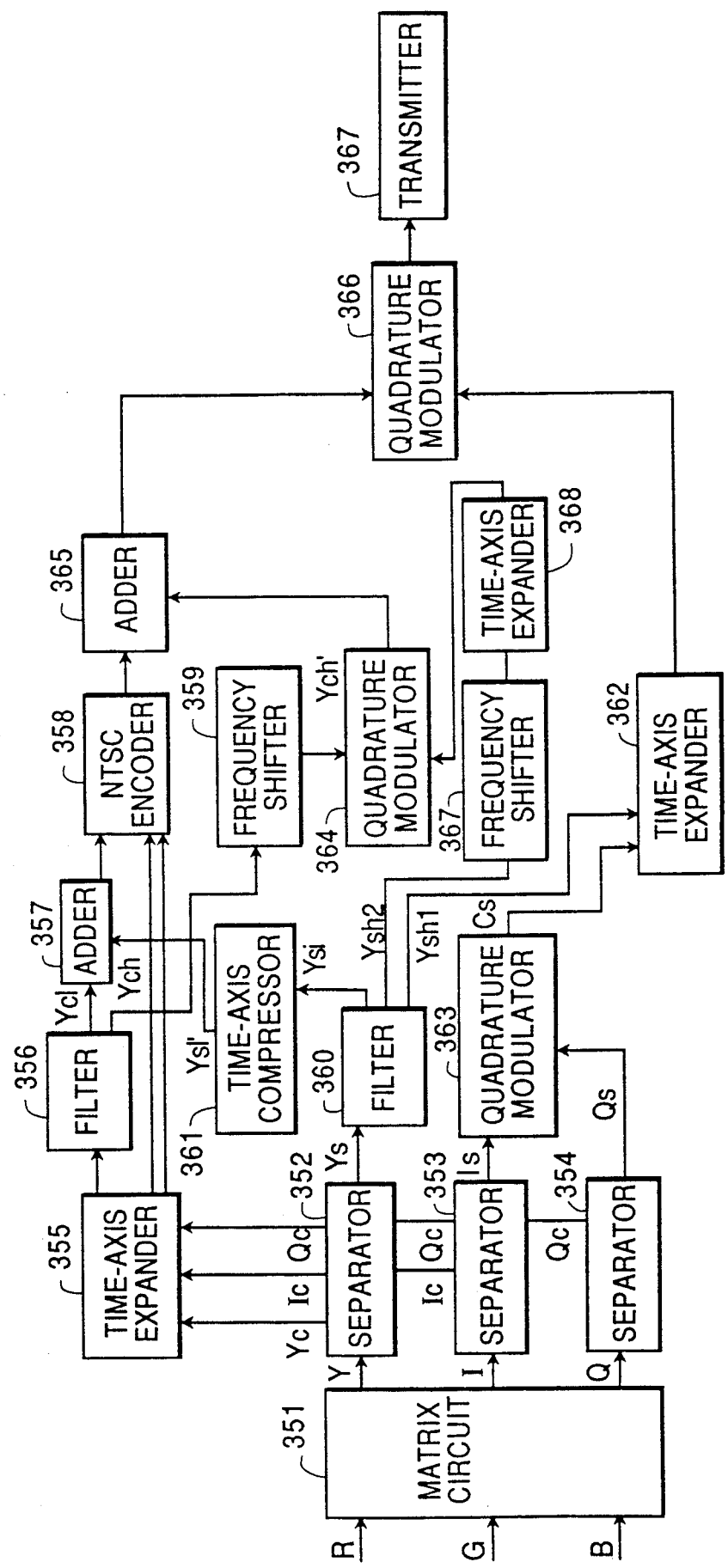
Figure 25B:
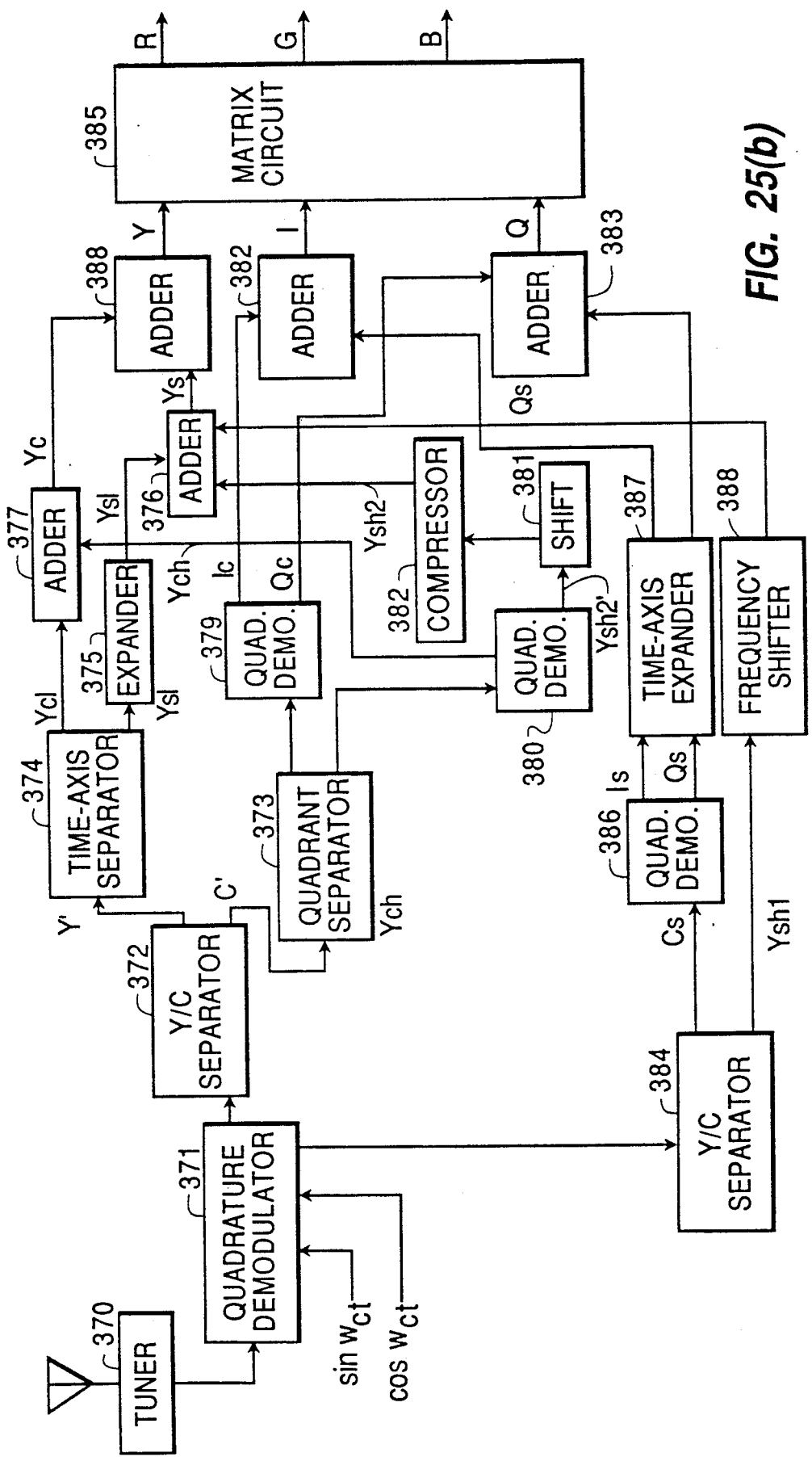

FIG. 25 (a) is a block diagram showing another television multiplex signal processor at the transmission side. In this case, the low frequency component of the luminance signal of the side panels is superposed at the hidden portion of overscanning of a receiver and front porch of the synchronous signal, the first high frequency component of the luminance signal of the side panels and the chrominance signal of the side panel are transmitted by quadrature modulation of the video carrier, and the second high frequency component of the luminance signal of the side panels and the high frequency component of the luminance signal of the center panel are transmitted by the "Fukinuki Hole". In FIG. 25 (a), R, G and B signals with an aspect ratio of 16:9 and 7 MHz bandwidth are fed into a matrix circuit 351 and are converted to a luminance signal Y, and chrominance signals I and Q. These signals are fed into three separators 352, 353 and 354 and a center panel, which is three quarters of the whole picture, and side panels, which are the rest of it, are split. Three center panels Yc, Ic, Qc of Y, I and Q signals, which come from the three separators, are fed to a time-axis expander 355 and expanded in time by 4/3, then the bandwidth of the luminance signal becomes 5.2 MHz, whereas the bandwidths of the chrominance signals are 1.5 MHz and 0.5 MHz. The center panel of the luminance signal is then fed to a filter 356 and separated into a low frequency component Yc1, whose bandwidth is DC to 4.2 MHz, and a high frequency component Ych, whose bandwidth is 4.2 MHz to 5.2 MHz. The low frequency component of the luminance signal of the center panel, Yc1 is fed to an adder 357, and the output of this adder and the chrominance signal of the center panel Ic and Qc are all fed into an NTSC encoder 358 and encoded into an NTSC composite signal. The high frequency component of the luminance signal of the center panel, Ych, is fed to a frequency shifter 359 and converted in frequency to a bandwidth of DC to 1.0 MHz to be called Ych'. On the other hand, the luminance signal of the side panels Ys is fed to a filter 360 and separated into a low frequency component Ys1, whose bandwidth is DC to 800 KHz, a first high frequency component Ysh1, whose bandwidth is 800 KHz to 4.0 MHz, and a second high frequency component Ysh2, whose bandwidth is 4.0 MHz to 5.2 MHz. The low frequency component Ys1 is fed into a time-axis compressor 361 and time compressed by 5, then can be superposed at the hidden part of overscanning of a receiver and a front porch of the synchronous signal at the adder 357. The first high frequency component of the luminance signal of the side panels Ysh1 is fed to a time-axis expander 362 and time-expanded by 4, then its frequency is 200 KHz to 1.0 MHz. This time-expanded signal can be transmitted by quadrature modulation of the video carrier. The second high frequency component of the luminance signal of the side panels Ysh2 is fed to a frequency shifter 367 and converted to a bandwidth of DC to 1.2 MHz. Then this signal is fed to a time-axis expander 368 and time expanded by 4 and its frequency is DC to 0.3 MHz. The chrominance signal of the side panels Is and Qs are fed to a quadrature modulator 363 and modulated to be a modulated chrominance signal Cs. This modulated chrominance signal Cs and the signal Ysh1 are fed to the time-axis expander 362 and combined. The output of this expander 362 is fed into a quadrature modulator 366. The frequency shifted high frequency component of the luminance signal of the center panel, Ych', and the frequency-shifted and time-expanded high frequency component of the chrominance signal of the side panels Csh' are fed into a quadrature modulator 364 and modulated by 3.9 MHz carrier, for example. If one chooses this carrier as having opposite phase line by line and opposite phase at 262nd line in next field, the quadrature modulated signal would exist in the first and third quadrants in a 2-dimensional spectrum figure, "Fukinuki Hole". The output of the quadrature modulator 364 is added to the NTSC composite signal by an adder 365, and the output of this adder is fed into the quadrature modulator 366 and modulated with the multiplex signal from the time-axis expander 362.

Especially, if one can modulate the carrier by the high frequency component of the luminance signal of the center panel as the lower sideband and the high frequency component of the luminance signal of the side panels as the upper sideband in a carrier suppression fashion, there arises a merit to reduce interference to the conventional television receiver because the former has a correlation with the main NTSC composite signal. As most of the conventional receivers use a narrowband chrominance modulator, interference caused by the lower sideband of the "Fukinuki Hole" becomes dot crawling which moves down and is very annoying. In this sense, it is desirable to modulate the carrier in the "Fukinuki Hole" as positioning the correlated signal in the lower sideband.

FIG. 25 (b) is a block diagram showing another television multiplex signal processor at the receiving side. In this figure, the input signal is a frequency shifted IF video signal from a tuner 370. A quadrature demodulator 371 is a video detector and demodulates a video signal. In this quadrature modulator, the input IF signal is demodulated by regenerated carriers $sin\omega ct$ and $cos\omega ct$, and then a main NTSC composite signal and a multiplex signal are obtained. The detected main signal is next fed to a Y/C separator 372 and the multiplex signal is fed into a Y/C separator 384 and separated to a high frequency component of the luminance signal of the side panels and a modulated chrominance signal of the side panels. Both Y/C separators have a 3-dimensional filter for a still picture and a 2-dimensional filter for a moving picture.

The modulated chrominance signal Cs of the output of the Y/C separator 384 is fed to a quadrature demodulator 386, and high frequency components of the chrominance signal of side panels Is and Qs are obtained. Both chrominance signals, Is, Qs, are then time-compressed in a time-axis compressor 387. Another output of the Y/C separator 384 is a high frequency component of the luminance signal of the side panels, Ysh and it is frequency shifted by a frequency shifter 388. The modulated chrominance signal C' of the output of the Y/C separator 372 includes a chrominance signal and a multiplex signal in the first and third quadrants, and is fed to a quadrant separator 373 to be converted to a luminance signal of the center panel and a multiplex signal. The multiplex signal is demodulated by a carrier, for instance, of frequency 3.9 MHz, introduced to a quadrature demodulator 380, and a high frequency component of the luminance signal of the center panel and side panels, Ych and Ysh are obtained. The separated modulated chrominance signal of the center panel Cc' is fed to a quadrature demodulator 379 and chrominance signals Ic and Qc are reproduced. This processing is exactly the same as the normal NTSC decoder.

On the other hand, one of the outputs from the Y/C separator 372, Y,' is fed to a time-axis separator 374 and a low frequency component of the luminance signal of the side panels Ys1', which is superposed at the hidden portion of overscanning of a receiver and a front porch of synchronous signal, is separated, and at the same time, the rest of it is separated and expanded in time by 4/3 to be a low frequency component of the luminance signal of the center panel Yc1. This Yc1 is fed to an adder 377, added to the high frequency component of the luminance signal of the center panel Ych, and becomes a luminance signal of the center panel Yc. The low frequency component of the luminance signal of the side panels Ys1' is fed to an expander 375 and time-expanded to Ys1, and then added to the first and second high frequency component of the luminance signal of the side panels, Ysh1 and Ysh2 by and adder 376 to be Ys. These signals, luminance and chrominance signals of the center and side panels, are combined by adders 388, 382 and 383 to be Y, I and Q. As the last stage, by a matrix circuit 385, these Y, I and Q signals are converted to R, G and B signals in order to display on a CRT, for example.

Figure 26B:
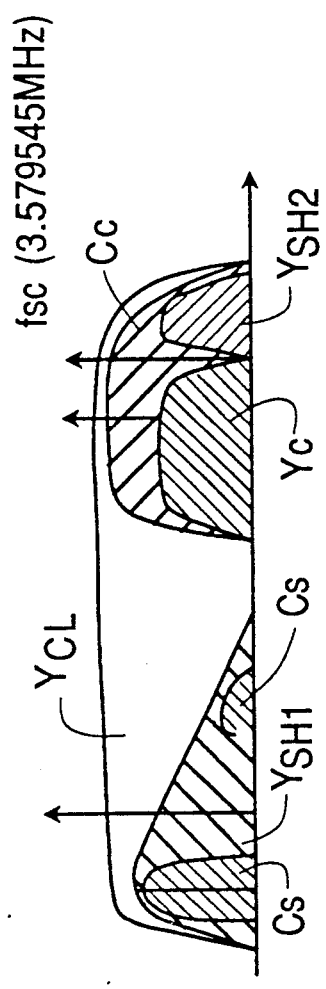
Figure 26A:
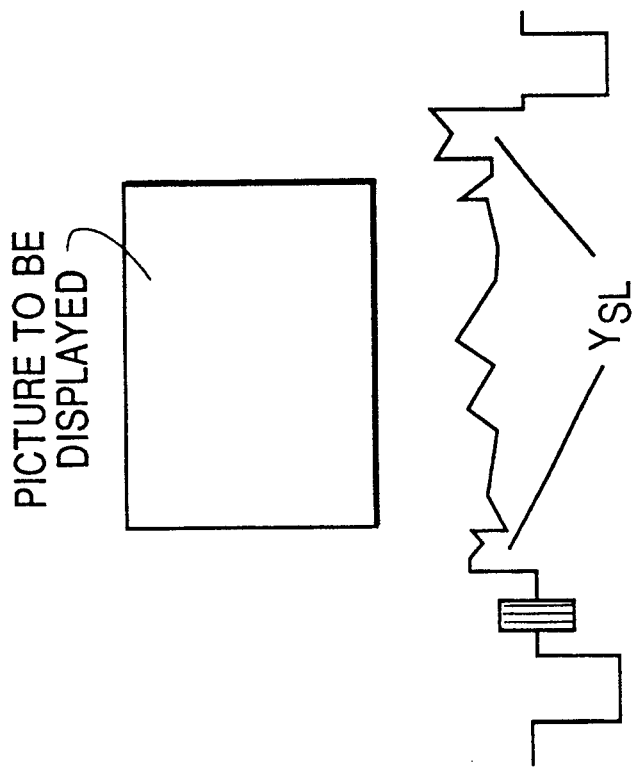

As explained above and shown in FIGS. 26(a)-26(b) the low frequency component of the luminance signal of the side panels is superposed at the hidden portion of overscanning of a receiver and front porch of the synchronous signal, the high frequency component of the luminance and chrominance signal of the side panels is transmitted by quadrature modulation of the video carrier, and the high frequency component of the luminance signal of the center panel and side panels are transmitted by the "Fukinuki Hole". The main merit of this transmission is to reduce interference to the conventional receiver by transmitting signals in the most appropriate way.

What is claimed is:

1. A signal processing apparatus in a television signal transmitting system, comprising:
    first group of delay lines for delaying an input signal to obtain a first series of signals in parallel;
    first group of coefficient multipliers for weighting said first series of signals;
    a first adder for adding outputs of said first group of coefficient multipliers;
    second group of delay lines for delaying an output signal from said first adder to obtain a second series of signals in parallel;
    second group of coefficient multipliers for weighting said second series of signals;
    a second adder for adding outputs of said second group of coefficient multipliers and one of said first series of signals; and
    transmitting means for transmitting the output signal from said first adder and an output signal from said second adder.

2. A signal processing apparatus in a television signal receiving system, comprising:
    input means for receiving a first signal and a second signal;
    first group of delay lines for delaying said first signal to obtain a first series of signals in parallel;
    first group of coefficient multipliers for weighting said first series of signals;
    a first adder for adding outputs of said first group of coefficient multipliers and said second signal;
    second group of delay lines for delaying an output signal from said first adder to obtain a second series of signals in parallel;
    second group of coefficient multipliers for weighting said second series of signals;
    a coefficient multiplier for weighting one of said first series of signals;
    a second adder for adding outputs of said second group of coefficient multipliers and an output of said coefficient multiplier; and
    a signal composer for composing the output signal from said first adder and an output signal from said second adder.

* * * * *